US007685048B1

(12) United States Patent
Hausman et al.

(10) Patent No.: US 7,685,048 B1
(45) Date of Patent: Mar. 23, 2010

(54) ELECTRONIC TRADING SYSTEM FOR FORWARDS SPREAD TRADES

(75) Inventors: Andrew Hausman, Summit, NJ (US); Allyson Houchen, Brooklyn, NY (US); Karen D. Tannenbaum, Oakland, CA (US); Ray Sansone, Redding, CT (US)

(73) Assignee: Bloomberg L.P., New York, NY (US)

( * ) Notice: Subject to any disclaimer, the term of this patent is extended or adjusted under 35 U.S.C. 154(b) by 1609 days.

(21) Appl. No.: 09/584,045

(22) Filed: May 30, 2000

Related U.S. Application Data

(60) Provisional application No. 60/152,017, filed on Sep. 1, 1999.

(51) Int. Cl.
*G06Q 40/00* (2006.01)
(52) U.S. Cl. .......................................... 705/37; 705/35
(58) Field of Classification Search ................... 705/37, 705/80, 26, 54
See application file for complete search history.

(56) References Cited

U.S. PATENT DOCUMENTS

| 3,573,747 | A | * | 4/1971 | Adams et al. ................. 705/37 |
| 3,581,072 | A | * | 5/1971 | Nymeyer ...................... 705/37 |
| 4,412,287 | A | | 10/1983 | Braddock, III .............. 364/408 |
| 4,677,552 | A | * | 6/1987 | Sibley, Jr. ..................... 705/37 |
| 4,903,201 | A | | 2/1990 | Wagner |
| 4,980,826 | A | | 12/1990 | Wagner |

(Continued)

FOREIGN PATENT DOCUMENTS

WO   WO 97/22072   6/1997

(Continued)

OTHER PUBLICATIONS

Adams, Richard. (Jun. 25, 1999). Brokers alter shape of things to come: Electronic Banking and Broking by Richard Adams: Competition is hotting up as foreign exchange traders and the big trading banks begin to recognise the degree to which electronic broking systems will help their business :[Surveys edition]. Financial Times,p. 6. Retrieved Nov.*

(Continued)

*Primary Examiner*—Narayanswamy Subramanian
*Assistant Examiner*—Kito R Robinson
(74) *Attorney, Agent, or Firm*—Frank J. DeRosa; Frommer Lawrence & Haug

(57) ABSTRACT

A trading system and method for trading forwards among a plurality of parties is presented. Among the features that the system implements are the following: counterparty enablement by forward term and/or region; a user selectable area on the monitor for executing again a trade that was just executed; a sweep trading feature for permitting a trader to sequentially aggress on a series of orders in the same forward; a spread-trading feature for allowing traders to directly trade on the difference between bid prices and offer prices for corresponding orders on a primary and secondary leg/link; providing a feature for joining orders wherein a trader may add a new bid or offer that has the same terms (e.g., price and quantity) of a perceived market best bid or offer; and enabling a party to make multiple bids and offers for the same forward within the same term at varying pricing.

2 Claims, 12 Drawing Sheets

U.S. PATENT DOCUMENTS

| | | | |
|---|---|---|---|
| 5,077,665 A | | 12/1991 | Silverman et al. |
| 5,101,353 A | | 3/1992 | Lupien et al. ............... 364/408 |
| 5,136,501 A | | 8/1992 | Silverman et al. |
| 5,297,031 A | * | 3/1994 | Gutterman et al. ............ 705/37 |
| 5,297,032 A | | 3/1994 | Trojan et al. ................ 364/408 |
| 5,375,055 A | | 12/1994 | Togher et al. |
| 5,394,324 A | * | 2/1995 | Clearwater ...................... 705/8 |
| 5,414,838 A | | 5/1995 | Kolton et al. ............... 395/600 |
| 5,715,402 A | * | 2/1998 | Popolo ........................ 705/37 |
| 5,758,328 A | | 5/1998 | Giovannoli |
| 5,787,402 A | * | 7/1998 | Potter et al. .................... 705/37 |
| 5,794,212 A | * | 8/1998 | Mistr, Jr. ...................... 705/26 |
| 5,809,483 A | | 9/1998 | Broka et al. .................. 705/37 |
| 5,818,450 A | | 10/1998 | Katsuta |
| 5,832,462 A | | 11/1998 | Midorikawa et al. |
| 5,842,178 A | | 11/1998 | Giovannoli |
| 5,884,286 A | | 3/1999 | Daughtery, III |
| 5,905,974 A | * | 5/1999 | Fraser et al. .................. 705/37 |
| 5,905,975 A | * | 5/1999 | Ausubel ....................... 705/37 |
| 5,915,209 A | | 6/1999 | Lawrence ................. 455/31.2 |
| 5,924,082 A | * | 7/1999 | Silverman et al. ............. 705/37 |
| 5,924,083 A | | 7/1999 | Silverman et al. |
| 5,950,176 A | * | 9/1999 | Keiser et al. .................. 705/37 |
| 5,959,621 A | | 9/1999 | Nawaz et al. |
| 5,966,699 A | * | 10/1999 | Zandi .......................... 705/38 |
| 5,995,602 A | * | 11/1999 | Johnson et al. ............. 379/116 |
| 5,995,947 A | * | 11/1999 | Fraser et al. .................. 705/38 |
| 6,005,925 A | * | 12/1999 | Johnson et al. ........ 379/115.02 |
| 6,006,201 A | * | 12/1999 | Berent et al. .................. 705/27 |
| 6,014,627 A | | 1/2000 | Togher et al. ................... 705/1 |
| 6,014,643 A | | 1/2000 | Minton ........................ 705/37 |
| 6,047,274 A | | 4/2000 | Johnson |
| 6,098,051 A | | 8/2000 | Lupien et al. ................. 705/37 |
| 6,223,167 B1 | | 4/2001 | Alaia et al. .................... 705/37 |
| 6,260,025 B1 | | 7/2001 | Silverman et al. |
| 6,282,521 B1 | | 8/2001 | Howorka |
| 6,317,727 B1 | | 11/2001 | May |
| 6,343,278 B1 | | 1/2002 | Jain et al. |
| 6,347,307 B1 | | 2/2002 | Sandhu et al. |
| 6,421,653 B1 | | 7/2002 | May |
| 6,519,574 B1 | * | 2/2003 | Wilton et al. ................. 705/35 |
| 2001/0037284 A1 | | 11/2001 | Finkelstein et al. |
| 2002/0082976 A1 | | 6/2002 | Howorka |
| 2002/0099647 A1 | | 7/2002 | Howorka |
| 2002/0099651 A1 | | 7/2002 | May |
| 2002/0107781 A1 | | 8/2002 | Neyman et al. |
| 2002/0116314 A1 | | 8/2002 | Spencer et al. |
| 2002/0116317 A1 | | 8/2002 | May |
| 2003/0033212 A1 | * | 2/2003 | Sandhu et al. ................ 705/26 |

FOREIGN PATENT DOCUMENTS

| | | |
|---|---|---|
| WO | WO 97/45802 | 12/1997 |
| WO | WO 99/19821 | 4/1999 |

OTHER PUBLICATIONS

Michaelis, Kontu. (Jun. 1981). ABT Currency Trading Programs. Commodity Journal, 16(4), 9. Retrieved Nov. 2, 2009.*

8 pages from HoustonStreet.com dated Aug. 22, 1999 (http://home.houstonstreet.com/fulltours/sections/022.htm,—/050.htm,—/060.htm,—/070htm,—/080htm,—081htm,—/083htm and /120 htm).

Dealing 200-2, Definitions and Rule Book, Version 6.2 (Reuters Limited, London) 1994.

Tafex: Transamerica Foreign Exchange, Tafex Systems Corporation (New York).

Chicago Mercantile Exchange's Proposed Globex Trading System, Division of Trading and Markets, Feb. 2, 1989.

* cited by examiner

<HELP> for explanation.　　　　　　　　　　　　　　　　　DG04 a Comdty EFMP
Screen Printed
　　　　　　　　　Counterparty Enablement

| CREDIT SETTINGS FOR COLUMBIA ENERGY POWER MARKETING CORP | | | | PgFwd for Instructions |
|---|---|---|---|---|
| | 3 | 6 | 9 | 12 |
| Spot Sep99 Oct99 | Nov99 Dec99 Jan00 | Feb00 Mar00 Apr00 | May00 Jun00 Jul00 | |
| ☒(N) ☒(N) ☒(N) | ☒(N) ☒(N) ☒(N) | ☒(N) ☒(N) ☒(N) | ☒(N) ☒(N) ☒(N) | |
| Aug00 Sep00 Oct00 | Nov00 Dec00 Jan01 | Feb01 Mar01 Apr01 | May01 Jun01 Jul01 | |
| ☒(N) ☒(N) ☒(N) | ☒(N) ☒(N) ☒(N) | ☒(N) ☒(N) ☒(N) | ☒(N) ☒(N) ☒(N) | |
| Aug01 Sep01 Oct01 | Nov01 Dec01 Jan02 | Feb02 Mar02 | | Legend: |
| ☒(N) ☒(N) ☒(N) | ☒(N) ☒(N) ☒(N) | ☒(N) ☒(N) | | N – None |
| | | | | B – Buy Only |
| These settings are not fixed to particular months. | | | | S – Sell Only |
| As prompt month rolls, they slide to next month | | | | T – Buy&Sell |
| Letters in parenthesis show counterparty setting | | | | |
| 1) ACCEPT | | | 2) CANCEL | |
| Warning!!! | | | | |
| Changing these settings will cancel your firm's outstanding | | | | |
| orders and will disable your firm from trading for 5 minutes | | | | |

Copyright 1999 BLOOMBERG L.P. Frankfurt:69-920410 Hong Kong:2-2977-6000 London:171-330-7500 New York:212-318-2000
Princeton:609-279-3000　Singapore:226-3000　Sydney:2-9777-8686　Tokyo:3-3201-8900　Sao Paulo:11-3048-4500
　　　　　　　　　　　　　　　　　　　　　　　　　　　　　　　　　　　　1365-488-1 05-Aug-99 15:06:49

Bloomberg
FINANCIAL MARKETS
COMMODITIES
NEWS

*FIG. 4*

CIN99OCT   25.90Y as of close  8/25                    Comdty  EMON
          Bid 25.25   Ask 25.70  Vol 400y  OpInt n.a.
     ⟨Menu⟩  RETURN TO MAIN MONITOR
CINERGY ELECTRICITY FORWARDS
 Add new BID

| Cinergy              Oct    1999 |

| Delivery: Physical power, Into Cinergy |
| Type: Financially firm, with liquidated damages |
| Dates: 10/01/1999 through 10/31/1999 |
| Hours: HE 0700 - HE 2200, Central Prevailing Time |

| Hours |       336 |
| Total MWh | 16800 |
| Principal | 357840 |

| Price |  21.30 USD $/MWh    50  MW/hour |
         Accept current price
        N- 0.05 better than best
        D- 0.10 better than best
        Q- 0.25 better than best
        B- 1.00 better than best
        M- Match the best Copyright 1999 BLOOMBERG L.P.  Frankfurt:69-920410  Hong Kong:2-2977-6000  London:171-330-7500  New York:212-318-2000
Princeton:609-279-3000  Singapore:226-3000  Sydney:2-9777-8686  Tokyo:3-3201-8900  Sao Paulo:11-3048-4500
                                                                         1352-31-1 26-Aug-99 12:03:45

Bloomberg PROFESSIONAL

*FIG. 6*

CIN99OCT    25.90Y as of close  8/25              Comdty EMON
      Bid 25.25   Ask 26.00 Vol 400y OpInt n.a.
<Menu> RETURN TO MAIN MONITOR          <PageFwd> MULTIPLE ORDER SCREEN
CINERGY  ELECTRICITY  FORWARDS
   Modify   BID

| Cinergy                Oct   1999 |

Delivery: Physical power, Into Cinergy
Type: Financially firm, with liquidated damages
Dates: 10/01/1999 through 10/31/1999
Hours: HE 0700 – HE 2200, Central Prevailing Time

| Seq# |   56   |
| Hours |   336  |
| Total MWh | 16800 |
| Principal | 357000 |

| Price |  21.25 USD $/MWh  Size  50 MW/hour |

Accept current price
  N– 0.05 better than best
  D– 0.10 better than best
  Q– 0.25 better than best
  B– 1.00 better than best
  M– Match the best
  C– Cancel the order Copyright 1999 BLOOMBERG L.P.  Frankfurt:69-920410  Hong Kong:2-2977-6000  London:171-330-7500  New York:212-318-2000
Princeton:609-279-3000  Singapore:226-3000  Sydney:2-9777-8686  Tokyo:3-3201-8900  Sao Paulo:11-3048-4500
                                                                      I352-31-0 26-Aug-99 11:31:35

FIG. 7

CIN99Q4    25.55Y  as of close 8/23                                Comdty EMON
         Bid 25.25  Ask 25.90  Vol 250y OpInt n.a.
93<GO> SUSPEND MY ORDS    98<GO> CXL MY CIN ORDS    99<GO> CXL FIRM'S CIN ORDS
CINERGY ELECTRICITY FORWARDS                                    Page 1/3
Q4  99  SELL  50 MWh at $ 15.50 /MWh  98<GO> YES  97<GO> NO

| Trades | Executable Bid | Offer | Forward Term | My Orders Bid | Offer |
|---|---|---|---|---|---|
| 1) 13.00@11:24 | 50 | 15.50/ | Sep 99 | | |
| 2) 15.00@11:24 | | | Q4 99 | | |
| 3) 22.00@11:24 | | | Oct 99 | | |
| 4) 24.00@11:24 | | | Nov 99 | | |
| 5) 34.00@11:24 | | | Dec 99 | | |
| 6) 38.00@11:24 | | | J-F 00 | | |
| 7) 45.00@11:24 | | | Jan 00 | | |
| 8) 53.00@11:24 | | | Feb 00 | | |
| 9) 55.00@11:24 | | | Mar 00 | | |
| 10) 53.00@11:24 | | | Apr 00 | | |
| 11) 68.00@11:25 | | | May 00 | | |
| 12) 44.00@11:25 | | | Jun 00 | | |
| 13) 46.00@11:25 | | | J-A 00 | | |
| 14) 121.00@11:25 | | | Jul 00 | | |
| 15) 144.00@11:25 | | | Aug 00 | | |
| 16) 167.00@11:25 | | | Sep 00 | | |
| 17) 170.00@11:25 | | | Q4 00 | | |

CIN99Q4  BID

| | GRAB | | | | | Comdty EMON |
|---|---|---|---|---|---|---|
| | AT 10:05 Vol 75 Op 70.00 Hi 71.95 Lo 70.00 OpInt n.a. | | | | | |
| | 93<GO> SUSPEND MY ORDS    98<GO> CXL MY P-V ORDS    99<GO> CXL FIRM'S P-V ORDS | | | | | |
| | PALO AND SP15 | | | | | Page 1/ 1 |
| | CONSTELLATION (132875) | | | | | SYSTEM ADMIN 11:31 |
| | Trades | Bid | Offer | Forward | MY ORDERS | |
| 102 → | 71.95@10:05 | 25 | 68.50/ 75.50 | 25 | Jun 00 | X <--> 25 66.00/ |
| 104 → | 71.50@10:05 | * 25 | 66.00/ 76.90 | 25 | | <--> |
| 106 → | 70.00@10:02 | 25 | 65.25/ | | | |
| 108 → | | 25 | 63.25/ | | | |
| | 101.00@10:37 | 25 | 95.25/102.75 | 25 | *√Q3 00 | <--> / 102.75 25 |
| | | 25 | 90.00/ | | √ Jul 00 | <--> / |
| | | * 25 | 105.00/125.00 | 25 | Aug 00 | X <--> 25 105.00/ |
| | | * 25 | 80.00/ | | Sep 00 | X <--> 25 80.00/ |
| | 51.00@08:34 | 25 | 48.25/ 51.75 | 25 | √Q4 00 | <--> / |
| | | 25 | 55.25/ 62.00 | 25 | √Oct 00 | <--> / |
| | | | / 60.00 | 25 | Nov 00 | / |
| | | 25 | 40.00/ 50.00 | 25 | Q1 01 | <--> / |
| | 48.00@10:51 | 25 | 47.10/ 48.00 | 25 | √Q2 01 | <--> / |
| | | | / 98.00 | 25 | Q3 01 | / |
| | | | / 62.95 | 25 | Cal 01 | / |
| | | ↓ SP | 15 ↓ | | ↓ SP | 15 ↓ |
| | | 25 | 60.00/ 67.00 | 25 | √Jun 00 | <--> |
| | √ − more information, #<GO> to view | | | | * − Orders entered by my firm | |

Copyright 1999 BLOOMBERG L.P.  Frankfurt:69-920410  Hong Kong:2-2977-6000  London:171-330-7500  New York:212-318-2000
Princeton:609-279-3000  Singapore:226-3000  Sydney:2-9777-8686  Tokyo:3-3201-8900  Sao Paulo:11-3048-4500
I941-585-2 22-May-00

Bloomberg PROFESSIONAL

*FIG. 9A*

⟨HELP⟩ for explanation.                                                      DG04 a Comdty EMON
93⟨GO⟩ SUSPEND MY ORDS     98⟨GO⟩ CXL MY CIN ORDS      99⟨GO⟩ CXL FIRM'S CIN ORDS
BIDS FOR Cinergy                                Oct 1999   Page 1/ 1
AEP SERVICE CORP.            (121886)                        SYSTEM ADMIN 11:31

| Type : Financially firm, with liquidated damages<br>Dates: 10/01/1999 through 10/31/1999<br>Days : 21 (Monday–Friday, excluding NERC holidays<br>Hours: HE 0700 – HE 2200, Central Prevailing Time | Executable  21.25/ 23.00<br><br>Last trade    50   22.00 |
|---|---|

1) ADD NEW BID   Price USD $   21.30   Size   50 MWh   11) QUICK ADD

Your    LIVE    Bids
 Time    Seq#   Price USD $  Size  MWh  Placed by

| 2) 11:31:52 | 56 | 21.25 | 50 | | 12) CANCEL |
| 3) 11:25:31 | 55 | 21.20 | 50 | | 13) CANCEL |

95 ⟨GO⟩ CANCEL ALL BIDS/OFFERS FOR THIS TERM

Copyright 1999 BLOOMBERG L.P.  Frankfurt:69-920410  Hong Kong:2-2977-6000  London:171-330-7500  New York:212-318-2000
Princeton:609-279-3000  Singapore:226-3000  Sydney:2-9777-8686  Tokyo:3-3201-8900  Sao Paulo:11-3048-4500
                                                                    I352-31-0 26-Aug-99 11:31:39

Bloomberg PROFESSIONAL

*FIG. 9B*

COB99SEP ↓38.50 —.55   38.00/38.60          Comdty EMON
At 13:50 Vol 25 Op 38.50 Hi 38.50 Lo 38.50 OpInt n.a.

| 93⟨GO⟩ SUSPEND MY ORDS | 98⟨GO⟩ CXL MY COB ORDS | 99⟨GO⟩ CXL FIRM'S COB ORDS |

COB AND NP15                                                  Page 1/ 3
ENRON POWER MARKETING INC. (134399)                       SYSTEM ADMIN 15:41

| Trades | Executable Bid / Offer | Forward Term | My Orders Bid / Offer |
|---|---|---|---|
| 1) 18.00@15:33<br>19.00@15:32<br>15.00@15:27<br>15.05@15:27<br>15.10@15:27<br>15.15@15:27<br>19.00@15:18<br>19.00@15:16 | / 18.00  25<br>/ 19.00  25*<br>/ 19.25  25* | Sep 99 | / 19.00  25<br>  19.25  25 |
| 2) | | Q4 99 | / |
| 3) | | Oct 99 | / |
| 4) | | Nov 99 | / |
| 5) | | Dec 99 | / |
| 6) | | Q1 00 | / |
| 7) | | Q2 00 | / |
| 8) | | Q3 00 | / |
| 9) | | Q4 00 | / |
| 10) | | Cal 00 | / |

\* — Orders entered by my firm

Copyright 1999 BLOOMBERG L.P.  Frankfurt:69-920410  Hong Kong:2-2977-600  London:171-330-7500  New York:212-318-200
Princeton:609-279-3000  Singapore:226-3000  Sydney:2-9777-8686  Tokyo:3-3201-8900  Sao Paulo:11-3048-4500
                                                                          I365-488-0 05-Aug-99 15:40:23

*FIG. 10*

⟨HELP⟩ for explanation.                                    DG04 o Comdty EMON
93⟨GO⟩ SUSPEND MY ORDS     98⟨GO⟩ CXL MY SPD ORDS     99⟨GO⟩ CXL FIRM'S SPD ORDS
EAST COAST SPREADS 1                                       Page 1/ 3
                                                                11:40

| Trades | Executable Bid / Offer | Forward Term | My Orders Bid / Offer |
|---|---|---|---|
| | ↓ CIN/PJM ↓ | | ↓ CIN/PJM ↓ |
| 1) 0.05@11:33 | * 50  1.20/ 1.25  50 | √Sep 99 | <--> 50  1.20/ 1.40  50 <--> |
| 2) -3.25@11:33 | * 50  1.00/ 3.00  50* | √Q4  99 | <--> 50  1.00/ 3.00  50 <--> |
| 3) 0.75@11:33 | *100  0.60/ 0.70  50* | √Oct 99 | <-->100  0.60/ 0.70  50 <--> |
| 4) 4.00@11:33 | * 50  3.00/ 4.00  50* | √Nov 99 | <--> 50  3.00/ 4.00  50 <--> |
| 5) 0.05@11:33 |  50  0.00/ 0.60  50* | √J-F 00 | <--> 50 -0.50/ 0.60  50 <--> |
| | ↓ CIN/ENT ↓ | | ↓ CIN/ENT ↓ |
| 6) 4.00@11:33 | * 50  3.00/ 4.15  50 | √Sep 99 | <--> 50  3.00/ 5.00  50 <--> |
| 7) 0.00@11:33 | * 50  2.00/ 3.00  50* | √Q4  99 | <--> 50  2.00/ 3.00  50 <--> |
| 8) 0.00@11:33 | * 50  0.05/ 0.05 150* | √Oct 99 | <--> 50  0.05/ 0.05 150 <--> |
| 9) 0.00@11:34 | *100 -0.90/ 1.00  50* | √Nov 99 | <-->100 -0.90/ 1.00  50 <--> |
| 10) 2.00@11:34 | * 50  1.00/ 2.50  50 | √J-F 00 | <--> 50  1.00/ 4.00  50 <--> |

√- more information, # ⟨GO⟩ to view          * - Orders entered by my firm

Copyright 1999 BLOOMBERG L.P.  Frankfurt:69-920410  Hong Kong:2-2977-600  London:171-330-7500  New York:212-318-200
Princeton:609-279-3000  Singapore:226-3000  Sydney:2-9777-8686  Tokyo:3-3201-8900  Sao Paulo:11-3048-4500
                                                                    1352-31-0 26-Aug-99 11:40:25

*FIG. 11*

ELECTRONIC TRADING SYSTEM FOR FORWARDS SPREAD TRADES

CROSS REFERENCE TO RELATED DOCUMENTS

Priority is herewith claimed under 35 U.S.C. §119(e) from copending Provisional Patent Application No. 60/152,017, filed Sep. 1, 1999, entitled "ELECTRONIC TRADING SYSTEM FOR ELECTRICITY FORWARDS", the disclosure of which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to an electronic trading system for trading forwards, particularly electricity forwards, and to certain features implemented by the electronic system which also have application in trading systems for other interests.

Electricity forwards, i.e., future commitments with regards to prices and quantities of electrical energy to be provided for which terms are established in the present, are traded directly between a buyer and a seller without an exchange. The use of electronic systems was recently introduced into the trading of electricity forwards. Two such electronic systems are Streamline and HoustonStreet.com. HoustonStreet.com is an e-commerce, Internet-based system which allows anonymous matching between traders until a binding trade is reached. More information about HoustonStreet.com may be found on its Web site, www.houstonstreet.com There have been tremendous advances in electronic trading of commodities. However, the commodities industry is seeking still further advances in speed, reliability and ease of use. These demands for technical advances apply to forwards trading as well, and there is a need in forwards trading for advances in electronic trading beyond those offered by Streamline and HoustonStreet.com.

OBJECTS AND SUMMARY OF THE INVENTION

Objects of the invention are to facilitate, simplify and speed up electronic trading, particularly forwards, e.g., electricity forwards.

Although the invention is not limited to application in a forwards trading system, or an electricity forwards trading system, the preferred application is in an electricity forwards trading system, e.g., the BLOOMBERG POWERMATCH® system (BLOOMBERG POWERMATCH is a registered service mark of Bloomberg L.P.). Similarly while the invention is not limited to an anonymous trading system, the preferred application is to an anonymous trading system, e.g., the BLOOMBERG POWERMATCH® system, where the identity of the parties negotiating a trade is anonymous up to the time that the trade is made.

The invention disclosed herein accomplishes the objects described above and provides the following features in electronic trading systems for trading forwards as well as other interests.

Counterparties authorized to trade in the trading system are enabled on a party by party and/or a trading region by trading region basis for given time periods, e.g., on a monthly basis. For example, two parties may trade with each other if at least one party is enabled to buy forwards and at least the other party is enabled to sell forwards. As noted above, the two-party trading, also referred to as two-way counterparty enablement for a trade, may be established within a specified trading area (e.g., trading region basis) and/or for a predetermined period of time (e.g., on a month by month basis). The counterparty enablement may be implemented by, for example, monitoring and storing a set of one-bit flags so that enablement processing is simple and fast.

The enablement feature described herein also may be used to calculate a total number of parties mutually enabled to determine whether a given party meets a minimum enablement requirement imposed by the trading system.

More specifically, the invention provides a method and programming system for counterparty enablement in a trading system for trading forwards among a plurality of parties. The trading system comprises a plurality of user stations, at least one for each party, a central computer and a communications network linking the user stations and the central computer. The central computer processes orders from the parties entered by the parties (i.e., users of the system) via the user stations and executes the orders between the parties in accordance with programming executed at least by the central computer. A database, accessed by the central computer, is provided for storing information (data, data records, etc.) defining a counterparty enablement relationship between pairs of the parties for trading forwards within a plurality of forward terms. That is, the information includes values that represent whether each of the parties in a counterparty pair is enabled or disabled from trading (i.e., buying and selling) with each other party in the pair during each of the plurality of forward terms.

Programming also is provided for setting and updating the counterparty enablement relationship between parties for each forward term. The programming is responsive to: (a) information entered at a user station by a first party of a respective counterparty pair to enable or disable a second party to trade with the first party; and (b) information entered at a user station by the second party of a respective counterparty pair to enable or disable the first party to trade with the second party. Programming is further provided to permit the central computer, in response to the counterparty enablement relationship for respective forward terms, to execute trades between counterparties in the forward terms, but only if counterparties are mutually enabled, i.e., at least one counterparty is enabled to buy and the other counterparty is enabled to sell forwards, within the specific forward term.

In one embodiment, the central computer may prevent order data of a first party from being displayed on a monitor of a second party. For example, when the first party's data record in a given forward term is not set by the second party such that the first party may trade with the second party (first party is not enabled), then the order data of the first party is not displayed on the second party's monitor. The central computer may also prevent order data of the second party in the given forward term from being displayed on a monitor of the first party.

In accordance with the present invention, each data record for each counterparty in each forward term can include data values to: prevent trading between counterparties; permit all trading between counterparties; permit only buying from one counterparty to the other counterparty; or permit only selling from the one counterparty to the other counterparty. Accordingly, trading is permitted, or enabled, only if at least one counterparty is enabled to buy, and at least one counterparty is enabled to sell. In one embodiment, the data record for each counterparty for each forward term may include as few as two bits having values that represent whether a counterparty is enabled for buying and/or for selling. The two bits, when evaluated together, represent whether a counterparty is enabled for buying only, enabled for selling only, enabled for all trading, or disabled for all trading, with the other counterparty.

In accordance with another aspect of the invention, interests may be arranged in groups and the data records may define the enablement of each pair of counterparties with respect to each group of interests. Programming logic operating within the central computer permits, in response to the status of respective data records for respective forward terms, trading between counterparties in any forward term but only if both counterparties are enabled with respect to each other for the specific forward term or terms and the particular group of interests.

Users of electronic trading systems (sometimes referred to herein as "traders") frequently have to assimilate information when deciding whether or not to make a trade. Screen displays are designed with this in mind. One feature which draws a viewer's attention to a screen, be it an electronic trading screen or the screen of almost any application, is flashing. It would be very helpful for an electronic trader to know at a glance who completed a trade. In accordance with the invention, trades are quickly flashed in different colors on a trading screen. Trades made by "involved parties" (e.g., counterparties) are flashed in one color, while trades made by all other parties are flashed in another color. This feature allows a user to quickly distinguish whether a trade that just took place involved that user's or another firm.

Another feature which quickly apprises a trader of trading changes in the system is a sliding ticker display. This feature allows users to observe bidding and trading activities across several trading regions or fields, etc. For example, when a market best price (bid/offer) of a forward changes, or a trade occurs, a notification is scrolled across the screen. In one embodiment, the price and size of the security is displayed for a trade, and, for best bid/offer changes, the name of the forward is provided. In the BLOOMBERG POWERMATCH® system embodiment of the present invention, the ticker notification is scrolled right to left at the bottom of the screen.

Another inventive feature which facilitates trading is to be able to change bid and offer values without manually typing new values. The invention provides a feature by which bid and offer values can be incremented or decremented without typing a number value. In the preferred embodiment, left/right ← → (or up/down) arrows are provided on screen which when selected, or "clicked" with a pointing device such as a mouse, electronic stylus, light pen or the like, increment or decrement the selected bid or offer by a predetermined value. The predetermined value of the increment or decrement may be any appropriate value and, in one embodiment, may vary from one trading region to another.

Still another inventive feature which facilitates electronic trading is to be able to quickly make the same trade again that was just completed. The invention executes the last trade again in response to a single selection, i.e., a click or keystroke, entered by each of the respective trading parties. In the preferred embodiment, a message is flashed for a set time period on the monitors of the two traders who just completed a trade. If both traders select an area on their respective monitors or hit a key on their respective keyboards that approves the trade within the set time period, the same trade is executed again. If no action is taken by either or both parties within the set time period, the trade is not re-executed and the "same trade again" feature is disabled. If action is taken, the same trade is re-executed (and may be executed multiple times), assuming that both trading parties take appropriate action (i.e., approve the trade) within the set time period following a previously executed trade.

Still another inventive feature which facilitates electronic trading is to be able to make a series of trades within given parameters at the same time. The invention provides a sweep trading feature which allows users to sequentially aggress on a series of orders in the same forward term. In the preferred embodiments, a pair of e-mail confirmations are sent out for each order executed. While the aggressor performs the execution process only once, it will be recorded as if multiple trades have been done. When confirming order price, the weighted average of all orders about to be executed may be used.

In yet another feature of the present invention, the electronic trading system provides for spread-trading. That is, the system includes spread-trading orders that have two links. A first link is maintained to a regular trading order for forwards on a primary leg and a second link is maintained to a regular trading order for forwards on a secondary leg. To permit a trader to directly trade on the difference between a bid price and an offer price for corresponding regular trading orders for forwards on the primary and secondary legs, the electronic trading system automatically generates one of a spread bid/offer or, a bid/offer for forwards on either the primary or the secondary legs. The components of the legs, that is, the actual bids or offers for regular trading orders for forwards upon which the spread difference is based, are generally not known to the trader. In spread trading, the trade is executed by the trader only once, and in response thereto, the system performs multiple trades.

In another feature of the present invention, the electronic trading system provides for joining orders. Using this feature a trader may add a new bid or offer that has the same terms (e.g., price and quantity) of a perceived best bid or offer. That is, the data relating to the best bid or offer is copied and a new bid or offer is added under the trader's own identification. The best bid or offer and the new bid or offer are for the same terms, but are posted for each trader individually. In one embodiment, the joining feature may be invoked by selecting with a pointing device a predefined area of a trader's monitor.

Frequently, a trader for one reason or another wants to temporarily suspend trading. In many conventional trading systems suspending trading triggers a deletion of active, unexecuted orders, as it would generally be undesirable to permit orders to remain on the system for fear that another party would attempt to accept the order. The inventor of the present invention has realized that it is inconvenient and time-consuming for traders to have to re-enter all information (e.g., terms) of the active orders that were deleted as a result of the trader's previous suspension when the traders are once again ready to start trading.

Accordingly, the invention provides a suspend-trading feature to eliminate this time-consuming activity. The suspend-trading feature eliminates the requirement to re-enter information pertaining to orders that were active at the time of a previous suspension. At least one perceived benefit of the feature is that it reduces the risk of error which may otherwise occur if the order information had to be manually re-entered.

The invention implements this feature by permitting a click or a single keystroke for suspension and another click or single keystroke for resumption of trading. Thus, a trader may suspend all of his or her active orders with a single click or keystroke and, alternatively, may restore the previously suspended orders.

In the preferred embodiment of the suspend feature, when orders are suspended, they are not deleted from the system, but are held pending resumption. The orders may remain on the user's own monitor, e.g., shaded, colored or otherwise identified to indicate that the orders are not active. The suspended orders disappear from everyone else's monitors. A "suspend" indication on the trader's screen changes to a "restore" indication after the suspend feature is activated. Selecting the restore indication, i.e., clicking it with a pointing device or keying in an appropriate area, restores all suspended orders to live status. While the orders are suspended, a user cannot add new orders, modify existing orders, or execute other's orders. The only actions the user can perform on the user's orders are to cancel or to restore the orders.

Another inventive feature is to allow a party to make multiple bids and offers for the same forward. This feature allows a user to place more than one order for any given forward on the same side (bid or offer) at the same time. This feature is useful when a trader wants to put a series of smaller orders, possibly at varying prices, instead of a single large order.

To preserve order anonymity in a trading system another inventive feature, referred to as blinding, is provided. Blinding prevents users from deducing the identity of a party to an order (i.e., a counterparty) by changing enablement settings. For example, if an unscrupulous trader wished to by-pass the anonymity requirement, one possible method to deduce the identity of an entity that had posted a particular bid/offer might be to disable one of the trader's enabled counterparties and to see if the particular bid/offer was deleted from the trader's executable bid/offer pool. If the trader correctly "guessed" the owner of the trade, the trade would be removed from the trader's pool, as only orders of mutually enabled traders are displayed in the pool. Having so identified the owner of a bid, the unscrupulous trader might then re-enable the counterparty such that the bid/offer would reappear in the pool and the trader might then accept the trade if the counterparty were an entity that the trader wishes to deal with.

Accordingly, to substantially minimize the occurrences of a quick disable/re-enable process as described above, the blinding process is provided. Blinding provides a process by which an entire firm is prevented from active trading for a set period of time (e.g., about 5 minutes) after an enablement setting is changed by a user/trader in that firm. The blinding process may be implemented, for example, by blanking all monitors in the firm that are actively running the trading application.

The invention provides methods, systems and programming implementing the following features summarized above in a trading system for trading forwards among a plurality of parties. The trading system comprises a plurality of user stations, each including at least one display or monitor, at least one for each party, a central computer and a communications network linking the user stations and the central computer. The central computer processes orders from the parties entered via the user stations and executes orders between parties in accordance with programming executed at least by the central computer. Features of the trading system include, for example:

flashing information relating to trades that is displayed on user station's displays or monitors in different colors depending upon the source of the information, and wherein the information displayed on the monitor of a party that originated the information may be flashed in one color and while the information displayed on that monitor originating with all other parties may be flashed in another color.

providing a sliding ticker display on each monitor which displays a notification of a change in a market best price (bid/offer) of a forward or a notification that a trade occurred, and wherein the notification that a trade occurred may provide the price and size of the forward, and the notification that a change in the best bid/offer of a forward may provide the name of the forward.

providing a selectable area on the monitor which when selected increments or decrements a selected bid or offer value, and wherein the selectable area may comprises left/right ← → (or up/down) arrows. As referred to herein, a selectable area on the monitor is an area that may be selected, or clicked, with a mouse or other similar such pointing device, to invoke a specific action.

providing a user selectable area on the monitor which when selected causes the central computer to execute again a trade that was just executed, and wherein the selectable area may remain active for a given time.

providing a sweep-trading feature which allows users to sequentially aggress on a series of orders in the same forward term.

providing a spread-trading feature that allows traders to directly trade on the difference between bid prices and offer prices for corresponding trading orders on a primary and secondary leg/link.

providing a feature for joining orders wherein a trader may add a new bid or offer that has the same terms (e.g., price and quantity) of a perceived market best bid or offer. Preferably, the joining feature is invoked by selecting a selectable area on the trader's monitor.

enabling a user to temporarily suspend all orders of that user without deleting the orders and to reactivate the orders without re-entering data pertaining thereto, and wherein a first selectable area on the monitor is provided which when selected suspends the orders, and a second selectable area on the monitor is provided which is active after the first selectable area is selected to cause to the orders to be reactivated, and wherein suspended orders are displayed on the monitor of the party who suspended the order in a different background or color from other orders and suspended orders are not displayed on the monitors of other users.

enabling a party to make multiple bids and offers for the same forward within the same forward term at varying pricing terms.

providing a blinding feature by which the trading system disables an entire firm from trading for a set period of time after a counterparty enablement setting is changed by a user in that firm, and wherein order information is prevented from being displayed on all monitors of the disabled firm and orders entered by the disabled party are prevented from being displayed on the monitors of all other firms.

providing a reserve trading feature for which a size of a trading order may include a displayed quantity (e.g., in MWh) and a non-displayed quantity. Using this feature a trader may input an additional quantity (i.e., a reserve) that the trader is willing to trade without alerting the market. The reserve may be automatically drawn to allow a trade in excess of an originally displayed amount (satisfy a counter-offer of a quantity greater than the originally displayed amount) or to automatically post a new trading offer after a completion of a trade.

Accordingly, the present invention provides trading systems and methods for trading forwards among a plurality of parties, wherein the systems and methods include information defining a counterparty enablement relationship between a pair of the parties for trading forwards within a plurality of forward terms, and programming for completing trading orders between a given counterparty pair for forwards in a given forward term in response to the counterparty enablement relationship between the given counterparty pair.

The invention further provides trading systems and methods for trading forwards among a plurality of parties, wherein the systems and methods include information defining a counterparty enablement relationship between a pair of the parties for trading forwards within forward terms, programming for updating the counterparty enablement relationship in response to information entered by the parties, and programming for completing trading orders between a given counterparty pair for forwards in response to the counterparty enablement relationship between the given counterparty pair.

The invention still further provides trading systems and methods for trading forwards among a plurality of parties, wherein the systems and methods include information defining a counterparty enablement relationship between a pair of the parties for trading forwards within forward terms, and programming for completing trading orders between a given counterparty pair for forwards in response to a value of the information defining the counterparty enablement relationship between the given counterparty pair, wherein a trading order is completable when the value indicates that at least one party of the given counterparty pair is enabled to buy and at least the other party is enabled to sell forwards within the given forward term.

The invention yet further provides trading systems and methods for trading forwards among a plurality of parties, wherein the systems and methods include programming for completing trading orders between a given counterparty pair for forwards in a plurality of forward terms in response to a status of a counterparty enablement relationship between the given counterparty pair, wherein the forward terms include a predetermined number of months and trading regions, and wherein the counterparty enablement relationship is definable for all months and for all trading regions collectively, and for each month and each trading region independently.

BRIEF DESCRIPTION OF THE DRAWINGS

The invention is illustrated in the figures of the accompanying drawings which are meant to be exemplary and not limiting, in which like numerals in the different figures refer to like or corresponding parts, and in which:

FIG. 4 depicts a representation of the counterparty enablement by month screen;

FIG. 6 depicts the add new bid/offer screen;

FIG. 7 depicts the modify bid/offer screen;

FIG. 8 depicts the trade confirmation screen;

FIG. 9A depicts a regional trading screen that supports entry of multiple orders;

FIG. 9B depicts another embodiment of a multiple order screen (MOS);

FIG. 10 depicts a regional trading screen similar to the one depicted in FIG. 5 but which shows multiple orders for the same forward; and FIG. 11 depicts a consolidated trading screen for two regions for spread trading.

DESCRIPTION OF THE PREFERRED EMBODIMENTS

System Architecture

Figure 1:
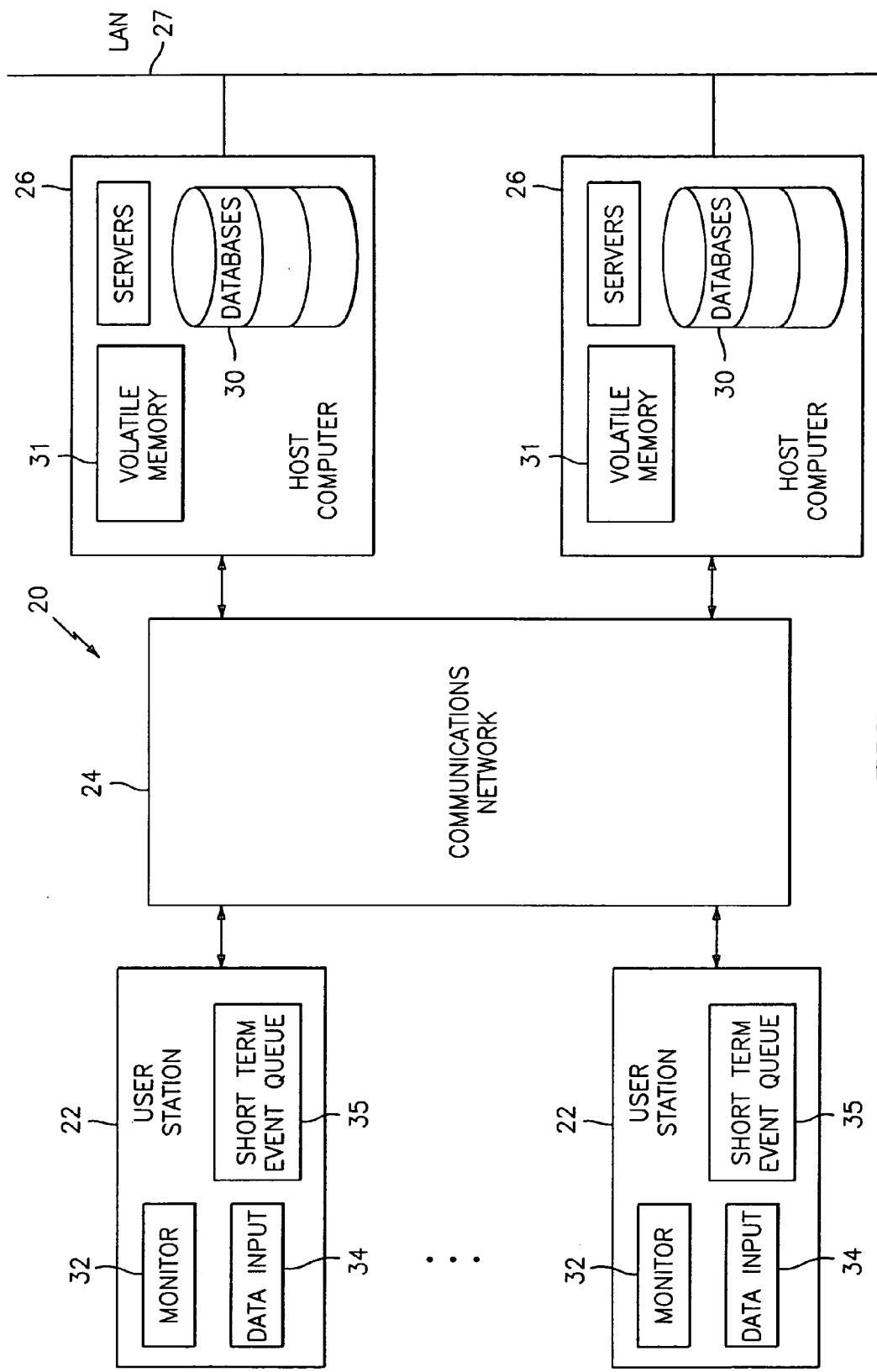
FIG. 1 is a block diagram of a trading and information system which supports various trading applications, including the trading of electricity products in accordance with the invention, and also supports the inventive trading features disclosed herein.

FIG. 1 depicts a trading and information system 20 which supports trading of over-the-counter electricity products, among other interests. System 20 includes user stations 22, a communications network 24 and host computers 26 connected in a distributed network such as, for example, a local area network (LAN) 27. In a preferred embodiment, the user stations 22 and the host computers 26 operate in a client/server architecture. Each user station 22, e.g., a "thin client", is enabled to run one or more applications supported by a respective server or host computer, i.e., one of the host computers 26. Each host computer 26 may include those databases 30 specific to the particular application supported by that host computer 26, and may also include volatile memory 31 shared by the functions performed by the host computer 26. When a particular application is being run, all or part of its related databases 30 may be loaded into the host computer's volatile memory 31. Each host computer 26 may manage data storage and retrieval for the application it supports, and may include a crash recovery database for use in the event that the host computer 26 terminates abnormally (e.g., crashes). The user stations 22 include at least one output device such as a display or monitor 32 (typically more are provided), a short term event queue 35 for storing information regarding the monitor 32, and data input devices 34 such as, for example, a keyboard and pointing device such as a mouse, track ball, pressure sensitive pad, and an electronic stylus, light pen or the like.

In accordance with the present invention, the user stations 22, communication network 24 and host computers 26 and their respective components, should be construed broadly to include personal computers, work stations, portable devices and other such computing and communication hardware operatively coupleable over wired and/or wireless communication networks as is generally known to those in the art. Accordingly, it is within the scope of the present invention for the apparatus disclosed herein to be merely illustrative of apparatus suitable for executing the inventive methods and processes taught herein.

Figure 2:
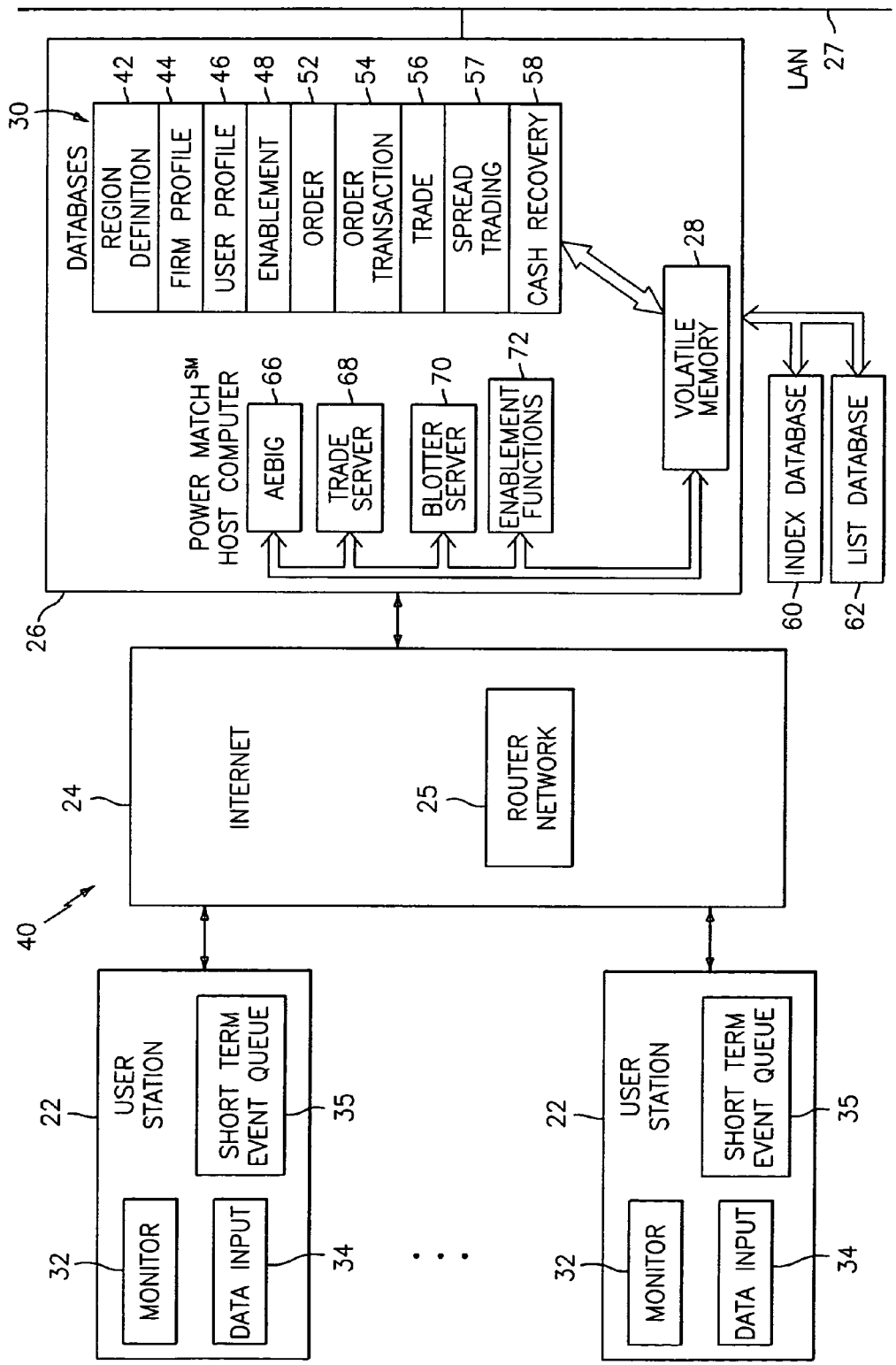
FIG. 2 is a block diagram of a BLOOMBERG POWERMATCH® system for trading electricity products in accordance with the invention and for implementing the inventive trading features disclosed herein as used in the BLOOMBERG POWERMATCH® system.

One embodiment of a system such as the one described above is currently distributed by the assignee of the present invention, Bloomberg L.P. In this embodiment, the communications network 24 includes a router network 25 which determines the particular host computer 26 responsible for supporting the particular application currently running on a particular user station 22. Accordingly, the router network 25 routes communications from user stations 22 to the appropriate host computer 26. In the system distributed by Bloomberg L.P., the communications network 24 includes an intranet and/or extranet network accessible by authorized users. The part of the system 20 which is used to trade electricity products is currently in use under the service mark BLOOMBERG POWERMATCH®. FIG. 2 shows the BLOOMBERG POWERMATCH® system 40 portion of the trading and information system 20. In one embodiment, the host computer 26 for the BLOOMBERG POWERMATCH® system 40 is a relatively large server available, for example, from Data General.

In accordance with the present invention, the host computer 26 supports at least the following functions.

EMON This is primary a trade monitoring function. All trading activity is performed from an EMON screen. Preferably, there is a separate EMON screen for each trading region (e.g., nine regions). There may also be custom EMON screens (e.g., three screens for all east, all west, and all short term trading regions). As described in detail below, one or more trade servers 68 (FIG. 3) support the EMON functions.

EORD This is an order blotter function. All order activity such as, for example, additions, modifications, and cancellations, are monitored by this function. EORD also allows viewing of full information about a particular order, and its audit trail. Through a special menu, users can also view order history for previous days, and download orders as a text file or as a formatted file such as, for example, as an Excel™ spreadsheet. As is described in detail below, a "blotter" server 70 (FIG. 3) supports the EORD functions.

ETRD This is a trade function, which is substantially similar to the EORD function, but for trades. This function monitors all trade information including the counterparties, the price, the quantity, etc. This function allows cancellation of trades, and provides for given mutual trader consents. The function also permits the viewing and downloading of trade histories (audit trial). The blotter server 70 also supports the ETRD functions.

EFMP The is a setup function, which is used to maintain region, firm, user and enablement databases. This function can also be used to broadcast a message to all traders. The EFMP functions are performed by execution screen event handlers (AEBIG) 66 (FIGS. 2 and 3) preferably implemented as software routines and processes 72 (FIG. 2) within the host computer 26.

The host computer 26 manages and supports the following databases (FIG. 2).

Region definition database 42. Each record defines region information such as, for example, region number, number of the list of forwards for that region, server process name and number, minimal order size and region title.

Firm profile database 44. Each account is a separate record. So, if a firm has more than one account, it has several records. The record stores, for example, firm name, contact information, commission rates, back office e-mail addresses and various profile flags.

User profile database 46. The BLOOMBERG POWERMATCH® system 40 is proprietary and access is limited to certain authorized persons. Since only specially authorized/enabled users can trade on it, the user profile database stores information such as, for example, user name, number, contact information, access level and access flags for these authorized persons. In one embodiment, user access levels include: 0—view only; 1—regular trader; 2—firm administrator (e.g., the trading firm's employee); 3—system administrator (e.g., a Bloomberg's employee); and 4—master.

Enablement database 48. Every pair of firms (counterparty pairs) have a record, which contains month-by-month buy and sell flags. This database includes information as to whether two firms of each pair are enabled and, thus, can see each other's orders and trade against each other.

Order database 52. Every order entered into the BLOOMBERG POWERMATCH® system 40 is stored in this database, which may be keyed by, for example, date/region/sequence number. Filled and canceled orders are maintained in this database under the appropriate status.

Order transaction database 54. Whenever an order is changed, a record explaining the change is added to this database to maintain an audit trial. This database stores and may be accessed to view respective order audit trails.

Trade database 56. When a trade occurs, a record is created in this database which includes buyer/seller information, identity of the aggressor (purchaser), commission rates, trade price/rate/total trade size and other relevant data.

Spread-trading database 57. This database includes information pertaining to to the spread-trading feature of the present invention. For example, the spread-trading database 57 may include information identifying forwards upon which a spread order is based.

Crash recovery database 58. This database exists only as a crash recovery measure. It stores status of all users currently running EMON functions. If a trade server 68 crashes and is brought back up, this database immediately reloads all current data, and substantially restores a current operating state of all users without them even knowing that a crash occurred.

The trading system 20 includes the following databases which are shared by the BLOOMBERG POWERMATCH® system 40 and other systems within system 20, i.e., they are not specific to the BLOOMBERG POWERMATCH® system 40:

Index database 60. This database stores commodities, indices, futures, and many other interests, as well as the electricity products traded using the system 40.

List database 62. This database stores a series of lists of interests (i.e., forwards), one list for every defined region determining which forwards are traded there, and in what order to display them on the monitor.

Figure 3:
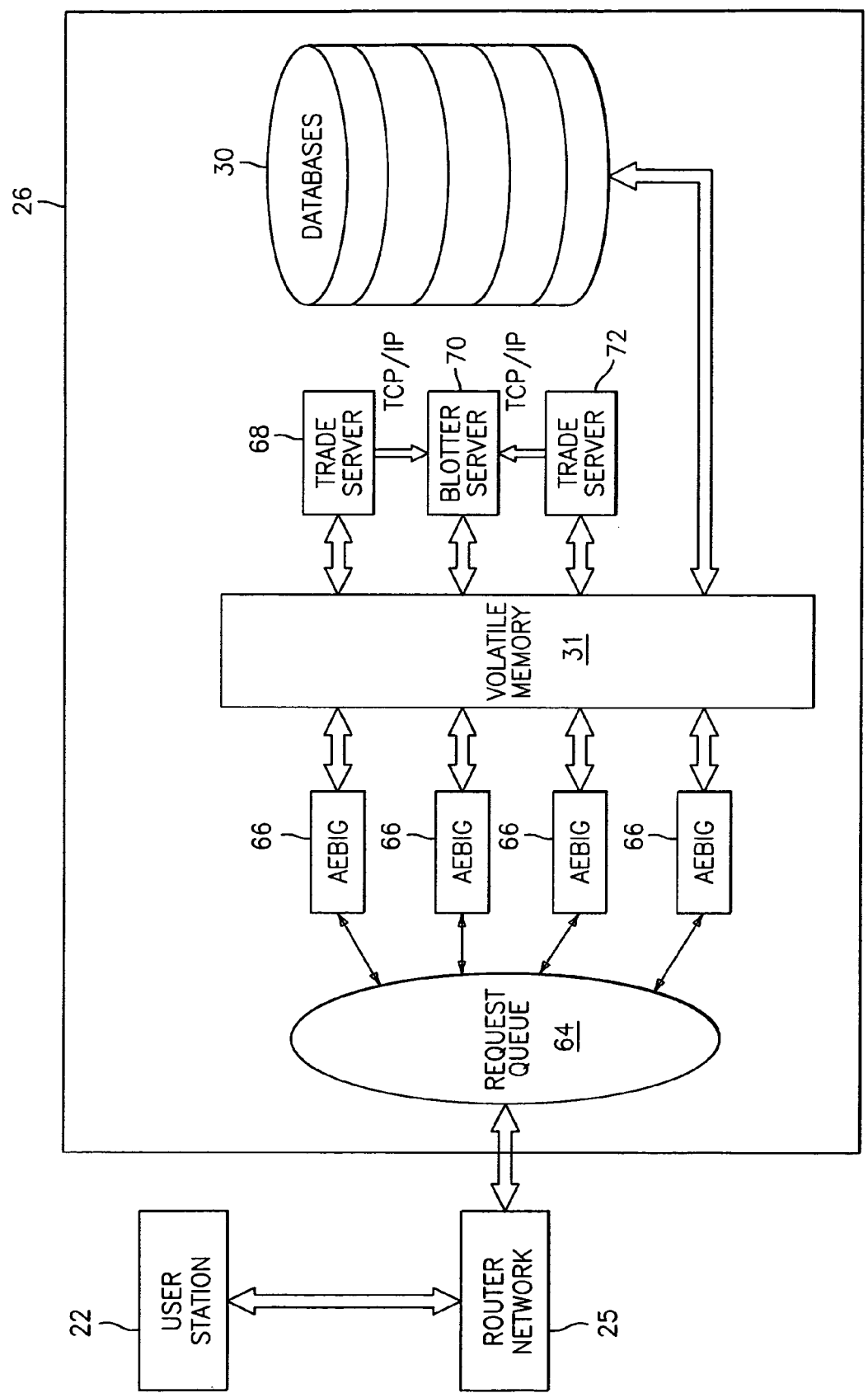
FIG. 3 is a process flow diagram of the BLOOMBERG POWERMATCH® system depicted in FIG. 2.

FIG. 3 illustrates a process flow for trades in the BLOOMBERG POWERMATCH® system 40. All BLOOMBERG POWERMATCH® system functions are run on the host computer 26, which includes an incoming request queue 64, auto execution screen event handlers ("AEBIG") 66, trade servers 68 implementing the EMON functions and a blotter server 70 implementing the EORD and ETRD functions. As mentioned, the AEBIGs 66 are preferably implemented as software routines executed on the host computer 26. Similarly, the incoming request queue 64 is preferably implemented as software routines on the host computer 26. The trade servers 68 and the blotter server 70 include volatile memory (not shown). As shown in FIG. 2, the host computer 26 includes volatile memory 28 and the BLOOMBERG POWERMATCH® system databases 30, more particularly referred to as databases 42-58.

Referring to FIGS. 2 and 3, a user station 22 running a trading system client application, in accordance with the present invention, forwards a request to the communications network 24. Routers, in a router network 25 portion of the communication network 24, determine the particular host computer 26 responsible for supporting (i.e., serving) the client application running on the requesting user station 22, and route the request to the appropriate host computer 26.

User requests from a user station 22 running the BLOOMBERG POWERMATCH® client application that arrive at the host computer 26 are queued in request queue 64 and are distributed between several instances of the AEBIG 66 for processing. All EMON activities in the queue are passed to an appropriate trade server 68. Each trade server 68 may support one or more of the trading regions (e.g., nine) in the system 40. The EFMP enablement functions are handled directly by an instance of the AEBIG 66, as shown in FIG. 3. EORD and ETRD events are handled by blotter server 70. The trade servers 68 update the order, order transaction and trade databases, 52, 54 and 56, respectively. The trade servers 68 also report all order and trade updates to the blotter server 70. Communication among the AEBIGs 66, the trade servers 68 and the blotter server 70 are achieved through conventional means such as, for example, with TCP/IP socket connections.

With reference again to FIGS. 2 and 3, user initiated events and system processing proceeds as follows:

1. Each selectable portion or object on a user station monitor 32 is identifiable such as, for example, by an object ID. Upon selecting an object, an event is invoked and a request message, including at least the object ID, is sent to an AEBIG 66 via the router network 25 and the request queue 64, as described above. The AEBIG 66 passes the request message, including the object ID to the appropriate trade server 68 via a message queue/shared memory IPC scheme.
2. Upon receiving the request message, the trade server 68 verifies the user's and firm's permissions and status, determines what class of object has been selected, and in what monitor line.
3. Upon determining the class of the selected object, the trade server 68 processes the request message accordingly, updates any database as appropriate and sends results (e.g., requested information and/or the result of an executed process) back to the AEBIG 66. The AEBIG 66, in turn, forwards appropriate screen information to the user station 22 that initiated the request message. The AEBIG 66 is then released to process the next incoming screen event/request message.
4. Screen refreshing and updating processes proceeds as follows. Each user screen (i.e., monitor 32) is refreshed cyclically, e.g., every second, to update information displayed on the screen. For each refresh, a comparison is made between a stored prior screen and a prospective new screen. Only the differences are updated, unless there are substantial changes where the screen is repainted. For example, a screen may be repainted where the order structure has changed, e.g., after a trade was executed, or an order was modified or canceled or a new order placed. As part of the screen repainting procedure, a short term event queue 35 (preferably implemented in software) is maintained. The information within the short term event queue 35 includes highlighting and flashing information and timer information for each flash and highlight displayed on the monitor 32. For each repaint, the short term event queue 35 is checked to determine whether there is an active flash or highlight for any part of the screen. As part of screen refreshing process, the appropriate trade server 68 checks for the presence of bilateral counterparty enablement (discussed below). If an enablement change occurs, the party initiating the change is "blinded" (discussed below) and all orders of the blinded party are removed from the screens of other parties. The trade server 68 provides a user mode record (data record in the user profile database 46) for each user which stores relevant data about each user. The user mode record includes values representing a count of the number of orders placed by the user and the number of orders (per trading region) suspended by the user. Canceling an order decrements the appropriate values within the record and adding an order increments the values. If the suspended order count is decremented to a zero value in the "suspend" mode, the user is returned to live trading.

Counterparty Enablement (By Month)

The BLOOMBERG POWERMATCH® system 40 allows registered power marketers, utilities and other wholesale power traders in, for example, North America, to trade OTC electricity products anonymously (without being directly identified with their respective orders) with their approved (enabled) counterparties on a month-by-month basis and/or on a regional basis. These users/traders may specify for each of their potential counterparties the exact monthly contract dates in which they want to trade. The users may also specify, on a regional basis, each potential counterparty with which they will trade in the particular trading region. The enablement process, referred to hereinafter as counterparty enablement, may be created and/or updated at any time. However, if any counterparty enablement setting is changed during live trading sessions, the party changing the setting (and all other traders within their firm) are prevented from trading for a certain period of time, e.g., about five minutes. The no-trading feature is referred to hereinafter as "blinding," and is discussed in further detail below.

If a respective counterparty pair is mutually enabled, each party sees the trading activity of the other. The trading activity, however, is anonymous until a match is made and the parties proceed to complete a trade with each other. If either party of the counterparty pair is disabled from trading, the other party's trading activity will be blocked for the scope of the disablement, i.e., the month(s) and/or trading region(s) that were disabled. Since a disabled (non-enabled) party is not provided with order information, trading can only proceed between mutually enabled parties (by months and/or trading regions).

The counterparty enablement process allows a particular counterparty to fully trade for all months, not trade for all months or to partially trade on a month-to-month basis by setting values such as, for example: preventing trading between counterparties ("N"); permitting all trading between counterparties, i.e., buying and selling between the parties ("T"); permitting only buying from one counterparty to the other counterparty ("B"); or permitting only selling from the one counterparty to the other counterparty ("S"). Accordingly, trading is permitted, or "enabled," only if at least one counterparty is at least enabled to buy and at least one counterparty is at least enabled to sell. The user screen depicted in FIG. 4 is used to set and/or reset (i.e., update) counterparty enablement, on a month-by-month basis for a particular counterparty, e.g., Columbia Energy Power Marketing Corp.

The counterparty enablement process is performed by EFMP functions of the host computer 26. A record is provided in the enablement database 48 for every counterparty pair. Each record contains values, preferably implemented as four 32-bit fields, representing a first party buy field (32 bits), a first party sell field (32 bits), a second party buy field (32 bits), and a second party sell field (32 bits). Each bit of each of the 32 bit fields represents a particular month. For example, a bit 0 represents the current or spot month, and bits 1-31 represent 31 months in the future.

In one embodiment, the data record for each counterparty for each forward term may include two bits (i.e., one from the party's "buy" field and one from the party's "sell" field) having values that represent whether a counterparty is enabled for buying and/or for selling. It follows that the two bits, when evaluated together, represent whether a counterparty is enabled for buying only, enabled for selling only, enabled for all trading, or disabled for all trading, with the other counterparty.

Table 1 illustrates a preferred range of field values for the enablement bits of one of the counterparties, where disable is represented by "0" and enable by "1." Table 2 illustrates an example of enablement settings for a pair of counterparts for a given month.

TABLE 1

Possible Counterparty Enablement Settings

|   | Buy Bit Setting | Sell Bit Setting |
|---|---|---|
| T | 1 | 1 |
| N | 0 | 0 |
| B | 1 | 0 |
| S | 0 | 1 |

TABLE 2

Possible Counterparty Enablement Settings for A Given Month

|   | First Party Buy | First Party Sell | Second Party Buy | Second Party Sell |
|---|---|---|---|---|
| T | 1 | 1 | 1 | 1 |
| N | 0 | 0 | 0 | 0 |
| B | 1 | 0 | 0 | 1 |
| S | 0 | 1 | 1 | 0 |

Tables 3 and 4 further illustrate enablement examples for the preferred range of field values (Table 3) and for the preferred range of months, i.e., the current month (0) out 31 months in the future (Table 4).

TABLE 4

Enablement Example

| Month | Field 1 First Party Buy | Field 2 First Party Sell | Field 3 Second Party Buy | Field 4 Second Party Sell |
|---|---|---|---|---|
| Spot(0) | 1 | 1 | 1 | 1 |
| 1 | 0 | 1 | 1 | 0 |
| * | * | * | * | * |
| * | * | * | * | * |
| * | * | * | * | * |
| 31 | 1 | 0 | 0 | 1 |

As is shown in Table 3, there is generally either no trading (where neither party is enabled or there is a mismatch such that no buy-sell combination is present), one-way trading (where either the first or second party is enabled only to buy or sell), or two-way trading (where both the first and second parties are enabled to buy and sell).

Upon startup, the entire enablement database 48 is fully loaded into the trade server 68 memory—it is needed so often that accessing it on the disk would make the trading system 40 prohibitively slow. Also, upon startup, when forwards are loaded, the trade server 68 obtains start/end contract dates for each forward. These dates are used to construct 32-bit fields, similar to ones in the enablement records. As discussed above, two firms (i.e., counterparties) are considered mutually enabled if there is at least a single sell bit set (a value of "1") for one party, and a corresponding buy bit set for the other party for a given forward S.

Accordingly, to verify that firm A can see and execute a bid placed by firm B in a forward S, the following logical equation (Eq. 1) has to evaluated (by the trade server 68) and yield a "true" result:

$$([A \rightarrow B]\text{sell}) \cap ([B \rightarrow A]\text{buy}) \cap (S) = (S); \quad [\text{Eq. 1}]$$

where S is the presence or absence of a forward for a given month.

TABLE 3

Enablement Example

| First Party Buy | First Party Sell | First Party Enablement Code | Second Party Buy | Second Party Sell | Second Party Enablement Code | Resulting Effect |
|---|---|---|---|---|---|---|
| 0 | 0 | N | 0 | 0 | N | No Trading |
| 0 | 0 | N | 0 | 1 | S | No Trading |
| 0 | 0 | N | 1 | 0 | B | No Trading |
| 0 | 0 | N | 1 | 1 | T | No Trading |
| 0 | 1 | S | 0 | 0 | N | No Trading |
| 0 | 1 | S | 0 | 1 | S | No Trading |
| 0 | 1 | S | 1 | 0 | B | First Sell to Second Only |
| 0 | 1 | S | 1 | 1 | T | First Sell to Second Only |
| 1 | 0 | B | 0 | 0 | N | No Trading |
| 1 | 0 | B | 0 | 1 | S | First Buy from Second Only |
| 1 | 0 | B | 1 | 0 | B | No Trading |
| 1 | 0 | B | 1 | 1 | T | First Buy from Second Only |
| 1 | 1 | T | 0 | 0 | N | No Trading |
| 1 | 1 | T | 0 | 1 | S | First Buy from Second Only |
| 1 | 1 | T | 1 | 0 | B | First Sell to Second Only |
| 1 | 1 | T | 1 | 1 | T | Full Two-way Trading |

Similarly, to determine if firm A is in any way enabled with firm B, and generally to calculate the total number of enablements a given firm has, the following logical equation (Eq. 2) has to evaluated by the trade server 68 to yield a "true" result:

$$((([A \rightarrow B]\text{sell}) \cap ([B \rightarrow A]\text{buy})) \cup (([A \rightarrow B]\text{buy}) \cap ([B \rightarrow A]\text{sell})) \neq 0.$$ [Eq. 2]

Since the enablement verification is a bit operation, it is very fast and efficient. As noted above, Eq. 2 is used to calculate the number of firms mutually enabled with a given firm such that a given firm may be evaluated to ensure it meets a minimum enablement requirement.

Counterparty Enablement (By Region)

This feature allows a firm to even further enhance its ability to control with whom it trades. The BLOOMBERG POWERMATCH® system 40 may operate with counterparty enablement by month alone, with counterparty enablement by trading region, or with both. With trading region enablement, the possible counterparty pairs are multiplied by the number of trading regions, and the enablement database 48 has a record for every counterparty pair/trading region combination. These records containing the counterparty pair to enablement by trading region are loaded into volatile memory 28 with the entire enablement database 48 as discussed above. Instead of single sets of enablement bits or flags controlling enablement for all trading regions, each region node within a trade server 68 has a full set of enablement bits. Each trade server 68 loads only data for the regions serviced by it. The EFMP function allows a user to switch a counterparty fully on or off, to switch individual regions on or off across all months, to set enablements by month across all regions at once, or to set individual months in any particular region. Therefore, the enablement relationship of a counterparty pair is definable for all months and for all trading regions collectively, and for each month and each trading region independently.

In this aspect of the present invention, two firms are considered mutually enabled if in at least one trading region there is at least a single "sell bit" set (a value of "1" in Table 3, for example) for one party, matched by a "buy bit" that is set for the other party of the respective counterparty pair. Table 5 shows the records needed for four parties (A, B, C, D) for simple enablement by month and Table 6 shows the records needed for the four parties for three regions (1, 2, 3).

TABLE 5

Counterparty Relationships

| |
|---|
| AB |
| AC |
| AD |
| BC |
| BD |
| CD |

The bit settings for an AB relationship are illustrated in Tables 1 and 2.

TABLE 6

Counterparty Relationships in Three Regions

| | | |
|---|---|---|
| AB1 | AB2 | AB3 |
| AC1 | AC2 | AC3 |
| AD1 | AD2 | AD3 |
| BC1 | BC2 | BC3 |
| CD1 | CD2 | CD3 |

The bit settings for AB/region relationships are similar to those in Tables 1-4 with additional bits for the regions.

Trading

Figure 5:
FIG. 5 depicts a representation of a regional trading screen.

All trading is initiated from a regional EMON screen, such as the CINERGY region shown in FIG. 5, and displayed on a monitor 32 (FIG. 1) of a user station 22. The CINERGY region is one of, for example, nine trading regions within the system 40. In one embodiment, regional EMON screens, which may be simultaneously displayed for other trading regions on other monitors 32, have the following column headings: "Trades", "Executable Bid Offer", "Forward Term" and "My Orders Bid Offer." It should be appreciated that these column headings are exemplary and may vary from one implementation to another. The screen displays the following information under the column headings.

Trades: The Trades column provides a listing of the most recently executed trades for the particular month (the term being designated in a Forward Term column, discussed below). In FIG. 5, the screen shows only one order per forward term. As is discussed below with reference to FIGS. 9A and 10, it should be appreciated that it is possible for a screen to display more than one order per forward term.

Executable Bid/Offer: The Executable Bid and Offer columns detail bids and offers entered into the BLOOMBERG POWERMATCH® system 40 by counterparties of mutually enabled counterparty pairs. The best bids or offers appear in the first line (labeled line "1)" at the left most edge of the screen). As referred to herein, "best" bids or offers are determined from a market best view where a highest value bid price and a lowest value offer price are deemed a best bid and offer, respectively. The bids and offers include a size (represented in, e.g., megawatt hours (MWh)) and price (represented in, e.g., U.S. Dollars and cents). It should be appreciated that it is within the scope of the present invention to display bids and offers values in other units of measure and/or with any other pertinent information such as, for example, contract type and delivery dates, days and hours information.

In accordance with one aspect of the present invention, orders (bids and offers) are displayed in different color schemes. For example, orders displayed in an amber color represent orders entered by other traders, either within the current trader's firm or in other firms. Orders displayed in a green color represent orders that the current trader has entered into the system. And, orders displayed in an amber color with a green colored asterisk (*) along side represent orders that were entered by another trader that is somehow affiliated with the current trader's firm. It should be appreciate that the color schemes described above are only illustrative and that it is within the scope of the present invention to utilize other such schemes and/or symbols to represent orders of various parties within the trading system 40. Additionally, while the screen in FIG. 5 shows only one executable order per forward term, it is within the scope of the present invention for multiple orders per term to be displayed and, hence, executable.

Forward Term The active trading term measured, for example, in months. In one embodiment, illustrated in FIG. 5, a green check mark to the left of the term month indicates that more information is available for the term. For example, the additional information may include a last trade and market depth. Selecting the term month or entering "{menu-number}<GO>" displays the additional information, e.g., "2<GO>" displays information with respect to the "Q4 1999" term.

My Orders: Orders entered by the particular user/trader or, if the user is an administrator, the orders by other users/traders within the administrator's firm are displayed.

A user/trader may place an order utilizing the EMON screen (FIG. 5) as follows. To add an order, a blank or available Bid or Offer area under the "My Orders" column is selected, e.g., lines labeled (at the left most corner of the screen) "16)" or "17)" under the My Orders column. In response, an Add New BID/OFFER screen appears (e.g., FIG. 6 shows an Add New Bid screen). Alternatively, the add new orders (bids and offers) processing may support the entry of multiple bids/offers for a forward. The multiple order processing is discussed in further detail below with reference to FIGS. 9A, 9B and 10.

To modify an existing order, a current Bid or Offer is selected under "My Orders" column. For example, the line labeled "3)" under the My Orders column is selected. In response, a Modify BID/OFFER screen appears (e.g., FIG. 7 illustrates a Modify Bid screen) and existing data pertinent to the selected order is displayed. For example, a name, a month of the contract, and sequence number may appear at the top of the screen, along with any current bids or offers, which would appear in the left column are displayed.

In one aspect of the present invention, when an existing order is selected for modification under the "My Orders" column, the order is suspended and removed from the screens of other parties. In this way, the "pre-modified" terms of the selected order are not available for other parties to accept.

Once either the Add New or Modify screens, and any existing data, is displayed, order data may be entered. For example, as is illustrated in FIG. 7, data may include the following information:

Delivery: Where the commodity can be delivered to fill the contract.
Type: The type of contract.
Dates: The dates of the contract.
Hours: The hours of delivery, and
   The total number of hours ($2^{nd}$ column)
total MWh: The total MWh.
Principal: The Price multiplied by Total MWh.
Price: The price in U.S. dollars per MWh.
Size: The quantity in megawatts per hour.

As illustrated in FIGS. 6 and 7, the price may be entered by replacing the existing value directly (typing over the value), or in a preferred embodiment, by selecting a code ("N," "D," etc.) from a menu that is displayed on the screen. The menu permits the entry of a value for the price in discrete increments above the current "best" bid/offer (e.g., "N=0.05 better than best," "D=0.10 better than best," etc.) as well as to match the current market best bid/offer ("M=match the best").

Similarly, the size of the trade, as expressed in, for example, megawatts per hour (MWh) may be replaced directly (by typing over the value), or by selecting a code from a menu that is displayed on the screen. In one embodiment, for example, one menu item may set both the price and size of a bid/offer in a predetermined way. For example, the "N" value discussed above with reference to the price value may also direct a value for the size of the order. That is, selecting "N" may increase the price of an offer by $0.50 and the size by 50 MWh. Further, the predetermined increment (and/or decrement) in the size and/or price of a bid/offer may vary from one trading region to the next. Therefore, in a first trading region, N may increment the price and size of an order $0.50 and 50 MWh, respectively. In a second region, N may increment the price and the size of the order $0.25 and 25 MWh. It is also within the scope of the present invention for only one of the price and the size of an order to vary from the first to the second trading regions.

Once the input or modification of respective fields of an order are completed, an order confirmation screen (not shown) may be displayed. The order confirmation screen may include fields that display previously inputted data and a selectable object, e.g., a "YES" button, that when selected, confirms the content of the order.

Once the new or modified order information is confirmed, the EMON screen for the specific trading region may then be displayed with the user's order highlighted in a green color scheme (discussed above) within the "Executable Bid/Offer" and "My Orders Bid/Offer" columns. Generally speaking, all orders entered by the trader in this way are "day orders" (an order that is valid only on the day when the order is entered), and remain valid (throughout that day) unless canceled.

As noted above, order information may be manually entered. In one embodiment, manual entry of values for a bid during addition and/or modification processes includes: entering "(menu-number)<CMDTY>EBY<GO>." Once the addition or modification screen is displayed (e.g., an "Add Bid/Offer" screen), price (U.S. Dollar) and size (MWh) data may be entered and/or modified. A selectable object, such as a "SUBMIT" button, is selected or a manual instruction "{enter-number}<GO>" is provided to enter the order into the trading system 40. A second selectable object, i.e., a "YES" button, is selected or a manual instruction "{menu-number}<GO>" is provided to confirm the order.

The manual entry of values for an offer proceeds in a similar way. For example, the process for entering and/or modifying order information includes: entering "{menu-number}<CMDTY>ESL<GO>." Once the addition or modification screen for an offer is displayed, a price (in U.S. dollars) and/or size (in MWh) may be entered or modified. A selectable object, such as a "SUBMIT" button, is selected or a manual instruction is entered "{menu-number}<GO>" to place or modify the order into the trading system 40. A second selectable object, i.e., a "YES" button, is selected or a manual instruction "{menu-number}<GO>" is provided to confirm the order.

In accordance with the present invention, the BLOOMBERG POWERMATCH® system 40 may not accept orders that cross the market (i.e., a bid/offer crosses the market when a price is entered that exceeds the current best bid or offer price). Alternatively, the system 40 may permit such orders, but only after a message is provided to the trader that warns/notifies the trader of the condition.

In one embodiment, if an entered order crosses the market, a flashing red warning message appears on the bottom of the screen and the entered price changes to the current best bid or offer price. The modified order may be cancelled and the trader may return to the originating EMON screen (FIG. 5) without submitting a bid or offer by selecting a "<MENU>" object. However, the modified order may be added as a current best bid/offer by selecting a "YES" button or by entering "{menu-number}<GO>."

In accordance with the present invention, if a bid and an offer match (i.e., the bids and offers have the same price and size terms), the BLOOMBERG POWERMATCH® system 40 does not automatically execute the trade. That is, the system 40 requires that individual traders each accept their respective portions of an order.

Referring again to FIGS. 5 and 7, a particular order may be cancelled by selecting the order under the "My Orders" column (FIG. 5) and choosing a "C-Cancel the order" option from the displayed menu (FIG. 7). The "<GO>" object executes the cancel order command. Once complete, the main EMON screen is displayed again (FIG. 5). To cancel all orders (both bids and offers) for a specific term month for a particular region, select any of a user's orders in that month. Select "<PageFwd> MULTIPLE ORDER SCREEN" option or press "<PAGE FWD>" object (FIG. 7). On the next screen (not shown), select "95<GO> CANCEL ALL BIDS/OFFERS FOR THIS TERM" or enter "95<GO>" to cancel all orders for that term month immediately. To cancel all of a user's orders for a particular region, enter "98<GO> CXL MY CIN ORDS" from the main EMON screen (FIG. 5) for the region. To cancel all of the firms orders for a particular region, enter "99<GO> CXL FIRM'S CIN ORDS" from the main EMON screen for the region (FIG. 5).

As is generally known in the art, executing a bid is referred to as "hitting a bid" and executing an offer is referred to as "lifting an offer." Therefore, a trader hits a bid or lifts an offer as follows. On the main EMON screen for the particular trading region (FIG. 5), an order is selected from the "Executable Bid/Offer" column. A first confirmation screen (FIG. 8) is displayed. The first confirmation screen includes banner 100 having, for example, a green "YES" box and a red "NO" box displayed in the right hand corner of the banner 100, along with a confirmation message that includes the term month, size and price of the selected order. To continue processing the trade, the "YES" box is selected. In response, a second confirmation screen is displayed (not shown) that also includes a "YES" box and a "NO" box. To execute (i.e., complete) the trade, the "YES" box is selected in the second confirmation screen. Once a trade is completed, the next best bid or offer becomes available to be hit or lifted.

On either of the first or the second confirmation screens, selecting the "NO" boxes cancels the previous selection and returns the trader to the EMON screen (FIG. 5). The EMON function does not monitor when the second confirmation window is open. Those orders that appear on the first line of a particular forward term are hit or lifted. However, in a "sweep trading" feature, discussed in further detail below, more than the order on the first line may be hit or lifted.

Trades may also be executed using the keyboard as follows. To hit bids, the command string "{menu-number}<CMDTY>EHB{size}{prize}<GO>" is entered. To lift offers, the command string "{menu-number}<CMDTY>ELO{size}{prize}<GO>" is entered.

Once a trade is completed, notification is forwarded to the traders of the completed transaction. In a preferred embodiment, for example, a green banner (i.e., banner 100 of FIG. 8) is displayed at the top of the screen that confirms the term, size and price of the trade, and the traders receive a message (e.g., an e-mail message) with trade details, including the identity of the counterparty, size, price and commission fee information.

Referring again briefly to FIGS. 2 and 3, the user station 22 running the BLOOMBERG POWERMATCH® client application transmits requests, order data and other selected information to the communications network 24. The communications network 24 routes these transmissions, in cooperation with the router network 25 portion of the communications network 24, to host computer 26. User requests arriving at the host computer 26 are queued in the request queue 64. The request queue 64 distributes the requests, in accordance with a predetermined service protocol, to one or more execution screen event handlers (AEBIGs) 66 for processing. All requests for the EMON activities described above are forwarded by an AEBIG 66 to an appropriate one of the trade servers 68. The trade servers 68 are programmed to check for specific events such as, for example, an order that "crosses the market" and to respond accordingly. As required, the trade servers 68 update the order database 52. The appropriate screen information responsive to a request or selection of a particular user is processed by one of the AEBIGs 66 from information supplied by a trade server 68 and forwarded back to the appropriate user station 22.

The trade servers 68 perform, for example, the following checks and/or functions (not necessarily in the order given) after a trade is confirmed (after selecting the second confirmation screen discussed above) to complete the trade. If a check fails, the prospective trade is not executed and the counterparties are notified and returned to an to EMON screen.

verify that the order is still available (has not been cancelled or processed);

verify that the trade is not between users in the same firm;

once a trade is completed, create a trade node in the trade server memory to store all relevant trade information in the trade server 68;

insert the trade node into a trade queue of a trade node, each of the trade nodes includes queues (i.e., lists) of bids, offers and trades for screen updating;

record the trade node data into the trade database 56;

send a message, e.g., a TCP/IP message, to the blotter server 70 that the trade took place;

provide a message to all users/traders, e.g., the sliding ticker message that includes price and size information (discussed below);

notify the counterparties of the trade (e.g., format and transmit an e-mail messages to counterparties with trade information including the identity of the other counterparty to the trade);

flash the active trade in different colors on the monitors 32 of the counterparties and of other users on the system. For example, a first color is used to highlight, on the monitors 32 of the counterparties, that a completed trade involved one of their orders, while a second color is used to display the trade on other user's monitors. The differing color scheme and the purpose thereof is discussed below;

update order database 54 (if the order was filled, then remove it; if the order was partially filled, then modify it);

send a message to blotter server 70 that the order was filled or modified.

Flashing Trades in Different Colors

This feature allows a user to quickly distinguish, by viewing the EMON screen on its monitor 32, whether a trade that just took place involved that user or not. As noted above, a first color is used to display, i.e., highlight, on the monitors 32 of the counterparties that a completed trade involved one of their orders and a second color is used to display the completed trade information on other user's monitors.

In one embodiment, for example, the executed trade in the executable bid/offer column is flashed red or amber on the monitors 32 of the involved parties (i.e., counterparties to the trade), and blue on the monitors 32 of all other parties.

The flashing feature is implemented as follows.

When a trade is executed, a trade node is created in the trader server 68 as discussed above. The trade node stores an identification (i.e., a user number) of the users (counterparty buyers and sellers) to the trade. The trade node is inserted into the trade queue for the traded forward, as discussed above. In addition, a trade highlight node is placed into the short term event queue 35 (FIG. 2) and set to expire in a given time, e.g., five seconds. While the highlight node is present in the short term event queue 35, rendering logic within the monitor 32 renders the line with the traded forward with a flashing background during user screen updates or repaints, as discussed above. To determine the flash color, the trade server 68 compares the user number whose screen is being updated with the counterparty user numbers stored in the trade node for the monitor 32 being updated. If there is a match, the trade server 68 provides screen data to the monitor 32 such that the flashing appears as, for example, a red or amber color. Otherwise, the flashing appears as, for example, a blue color.

Multiple Bids and Offers for the Same Forward on the Same Screen by the Same Party This feature allows a user to put more than one order for any given forward on the same side (i.e., enter multiple bids or offers) at the same time. This feature provides a user/trader the ability to place a series of, for example, lesser sized orders, possibly at varying prices, instead of a single larger sized order.

FIGS. 9A and 9B depict two exemplary embodiments for multiple order entry screens. For example, FIG. 9B illustrates two bids in a "Cinergy" trading region and an "OCT 1999" trading term for 50 MWh at $21.25 and $21.20, line items labeled "2)" and "3)" respectively, and a new, third bid being entered at line item "1)" for 50 MWh at $21.30. Accordingly, these three bids at varying prices are made instead of one bid for 150 MWh at either the $21.25, $21.20 of $21.30 price. FIG. 9A depicts the multiple order feature within a regional EMON screen wherein multiple bids and/or offers for a "June 2000" forward trading term are shown at lines 102, 104, 106, and 108.

One perceived benefit of multiple orders for a given forward is that there may be a higher percentage of traders that can satisfy one or more of the smaller orders and, therefore, pricing may be more competitive. Additionally, if traders are permitted to hit a bid and only partially fill an order, then (as discussed above) the order remains on the system once its size has been reduced to the remaining quantity. Thus, at least to the trader that filled a portion of the order is aware of the owner of the order and, thus, the owner of the order is no longer anonymous.

FIG. 9B includes an interface for adding multiple orders individually, labeled "1) ADD NEW BIDS". It should be appreciated that a similar screen is implemented for entering multiple offers for a forward. The add order interface is followed by an area displaying the user/traders existing live orders (e.g., labeled "Your Live Bids"). In addition to displaying the multiple order information, the embodiment illustrated in FIG. 9B displays the contract type, dates, days and hours information described above for the Add New BID/OFFER and Modify BID/OFFER screens (FIGS. 6 and 7).

In the embodiment illustrated in FIG. 9B, the screen is entered from the EMON regional screen (FIG. 5) by clicking a blank area under the "My Orders" column and selecting an option for multiple orders displayed within a displayed menu. Alternatively, the screen may be invoked from the Modify BID/OFFER screen (FIG. 7) by selecting an active <PageFwd> area. Upon entering this embodiment of the multiple order screen, a list of all of the user/trader's orders for the forward are displayed.

In FIG. 9B, the multiple order screen (MOS) provides:
a) use a "QUICK ADD" feature (line item labeled "11)" in FIG. 9B) to add a new order at a predetermined size and price (e.g., 5 cents better than market "best", currently displayed at line item "2)", so at $21.30 for 50 MWh);
b) add a new order at a manually entered price and size;
c) modify the price and/or size of an existing order by selecting it, the selection invokes the Modify BID/OFFER screen (e.g., the MODIFY BID screen illustrated in FIG. 7) and suspends the order being modified;
d) cancel an existing order, e.g., by selecting the "CANCEL" area displayed at line item "12)" for the bid at line item "2)", or at line item "13)" for bid "3)";
e) cancel all orders for the forward, e.g., by selecting area "95<GO> CANCEL ALL BIDS/OFFERS FOR THIS TERM" at the bottom of the screen.

Preferably, the MOS is a live monitoring screen. Therefore, it reflects changes made to display orders on other screens by other user/traders. In one embodiment, the MOS also includes the suspend and cancel areas displayed on the main EMON screen (FIG. 5), i.e., the "93<GO> SUSPEND MY ORDS", the "98<GO> CXL MY CIN ORDS" and the "99<GO> CXL FIRM'S CIN ORDS" areas.

If all orders displayed in the MOS are suspended, canceled or filled, the user/trader is returned to the main EMON screen (FIG. 5). Additionally, if an order is selected by another user/trader under their respective "My Orders" column, the order is suspended and, therefore, is removed from the MOS (and all other screens) of other users/traders.

The multiple order processing (FIGS. 9A and 9B) proceeds as follows:
Selecting a "<PageFwd> MULTIPLE ORDER SCREEN" on the Modify BID/OFFER screen (e.g., MODIFY BID screen shown in FIG. 7) invokes the MOS (FIG. 9B) and sets an MOS flag "on;"
The order information is modified and validated, or otherwise processed, as described above; and
The order information is updated within the order database 52 of the host computer 26 with the newly input information as described above.

FIG. 10 also depicts a regional EMON screen displaying multiple order information for a "Sep 99" forward term.

In one embodiment, the presence of multiple orders for a forward (i.e., for a forward term) is indicated by a user mode flag, that is, the MOS flag discussed above. When the MOS flag is set, a list of the user's orders within the "My Orders" column of the EMON screen is displayed along with, for example, other lists of forwards. Whenever an action is performed in the EMON screen, the host computer 26 evaluates the MOS flag and, if set, invokes multiple order processing.

If a user/trader selects an executable order in "Executable Bid/Offer" column of the EMON screen, the MOS is invoked. Further, the execution confirm line will remain active, regardless of whether it is for the same forward or not. That is, the functionality of the execution confirmation line remains the same. If the user/trader wishes to do so, they can execute a trade while in the MOS.

Clicking ← → Arrows to Change Order Prices

In accordance with the present invention, manual entry of a price of an order (i.e., bid/offer prices) may be avoided by selecting special functional elements displayed on the screen. For example, on the main EMON regional screen (illustrated in FIG. 5), arrows ("←" and "→") are presented on the top two rows, and on all rows in certain other screens. In accordance with one embodiment, the arrows are provided only on the monitors of specifically authorized persons, i.e., traders with a 'Fast update Enabled' flag set (i.e., turned on) in the EFMP function. Information providing the instructions for rendering the special functional elements (arrows) is passed from the trade server 68 to the user's monitor 32.

Multiple bids/offers appear on the EMON screen of the user who entered the bids/offers. In the EMON screen displaying multiple bids/orders, only the "best" or top bid/offer is active. The others orders are for viewing only. If a trade of the forward with the multiple bids/offers is executed, the next bid/order (displayed on a line below the "best" bid/offer) moves to the top and becomes active. On counterparty screens, after a trade, the next bid/offer is displayed in place of the trade order. Multiple orders may also be displayed on other user's screens to provide a "depth of the market."

One advantage of multiple bids/offers for the same forward is, for example, an immediate placement of a back-up bid/offer after a trade. That is, when a trade only partially fills an order, the unfilled, remaining portion of the order is added to the system automatically as a back-up order. The back-up order feature is more than just a time-saving feature, as it also preserves anonymity in trading as it may eliminate the need to maintain partially filled orders on the system 40.

In other words, a trader that partially fills an order is notified of the transaction. The notification typically includes the identity of each of the counterparty pairs. Therefore, at least the parties to the trade are informed of the identity of the other counterparty. Since the identity is known from the prior transaction, the counterparties may also deduce the owner of an order from the terms that are similar to (except as to sizing) those filled in the partial order. By substantially removing the ability to deduce counterparty identities, the anonymity of the trading is preserved. Accordingly, the back-up bid/offer process provides for a back-up order to be displayed, if the primary order is only partially filled. Generally speaking, the back-up order is for a different quantity (size), that is, the difference between the first order and the amount partially filled. Therefore, the identity of the counterparty of the original and back-up order remains anonymous.

The automated entry of pricing terms (e.g., by using arrows) processing proceeds as follows:

1. Each selectable region on a user station monitor 32 has an identification (e.g., a unique number) associated with it. Upon selecting the special functional element (arrow), an event is sent to one of the AEBIG 66. The AEBIG 66 sends the identification number of the special element to the appropriate trade server 68 via a message queue/shared memory IPC scheme.
2. Upon receiving the message, the trade server 68 checks the user and firm permissions and status, determines what class of selectable element has been selected, and in what monitor line.
3. Upon determining that the user has selected a fast update arrow, the trade server 68 locates the order to which the selection applies in the appropriate order queue.
4. The order price is adjusted up or down by a set amount, which may be, for example, $0.05 for standard orders, and $0.25 for short term orders. Preferably, if the resulting price falls below a predefined minimum, above a predefined maximum, and/or crosses the visible market, it is adjusted to conform to these boundaries. Alternatively, a message is provided to notify the user/trader that their order terms cross the market. Once the notification is given (and/or confirmed) the transaction continues at the inputted terms.
5. Once the price has been revised, the order record for the order is updated in the order database 52. Also, a price change transaction record is added to the order transaction database 54. Next, a message is sent to the blotter server 70 to register the change with the EORD function. If the action changed the market best price for the forward, a scrolling ticker is launched across the bottom of all user screens, as discussed above. That is, a "tick" (i.e., an indication of the movement of the order price) is sent to a "ticker plant" (i.e., a server providing the trading information used to format the scrolling ticker displayed on all users monitors 32).
6. The trade server 68 realigns the orders in the respective queues according to their current pricing ("best" orders first), invokes the screen highlighting features to highlight the order for about 5 seconds (notification of change), and updates all user monitors 32 on which the order is visible (i.e., the monitors of enabled counterparties).
7. Upon completion of these steps (or a failure to complete the steps), the trade server 68 sends the result back to the AEBIG 66, and releases the AEBIG 66 to process the next incoming screen event.

Same Trade Again

This feature allows two users/traders (i.e., a counterparty pair) who just completed a trade with each other to repeat the same trade again.

In one embodiment, the SAME TRADE AGAIN feature is available after the final confirmation of a previously executed trade. For example, after the "YES" button is selected on the second confirmation screen, control returns to the main EMON region screen (FIG. 5). For a predetermined period after the EMON screen is displayed, for example about 10 seconds, a "SAME TRADE AGAIN" message flashes at the top of the monitors 32 of each counterparty pair. In effect, the notification (i.e., flashing message) provides the counterparties a vehicle for repeating the same trade (same price and size of the order) once again. As described above, the short term event queue 35 (FIG. 2) and the highlighting functionality provide the message for the duration of the predetermined time period (e.g., about 10 seconds) in a similar manner as described above in connection with the flashing of trades in different colors. The SAME TRADE AGAIN message is generated from the trade node information. It should be appreciated that it is within the scope of the present invention to notify the counterparty pairs in various other ways.

To repeat the trade, each of the counterparties must each approve the transaction. That is, both user/traders have to select the SAME TRADE AGAIN message (or prompt) within the predetermined time period (e.g., about 10 seconds). Performing any other action including, for example, ignoring the message, disables the function.

During the predetermined time period, the trade node maintains a link to the last trade performed, so that if both users approve the transaction, the trade can be duplicated immediately. The trade server 68 replicates the trade node of the trade just completed, and all links in the original trade node are transferred to the replicated trade node. Thereafter, the processing is repeated with respect to the replicated trade node, except for order updating. Since the original order was already updated, there is nothing further to update. In one embodiment, a counter is provided to count the number of times a trade was repeated. The counter is maintained for user/trader statistical references and/or general information, as the system does not process the value stored in the counter. In a preferred embodiment, the SAME TRADE AGAIN feature is cyclic, meaning that the feature may be activated after each trade.

Sweep-Trading

This feature allows users to simultaneously aggress on a series of orders in the same forward. That is, the sweep trading process permits the selection of more than one available and executable order in the forward bid or ask queue and the execution of the selected orders until either a desired order quantity is filled or the queue is depleted of available orders. While the aggressor may perform the sweep execution process only once (selects a predetermined number of orders at one time), the process executes multiple trades, i.e., one for each selected order.

Referring to FIG. 10, multiple bids/offers are displayed for the "Sep 99" forward term. As discussed above, only the top bid/offer is active. Upon selecting (i.e., clicking) the top bid/offer, the next order in the queue becomes active and can be selected. The user may therefore sweep a queue of orders by sequentially selecting the active orders in the queue. While each order is sequentially selected, no trades are executed (completed) until the entire sweep transaction is approved. Preferably, approval (i.e., confirmation) of the sweep transaction is requested for the total size and weighted average price of the accumulated orders. For example, if three trades of 50 MWh were selected having prices of $33.90, $33.95 and $34.00, respectively, in the preferred embodiment, confirmation would be requested for a sweep transaction of 150 MWh @ $33.95.

If any changes occur between the first and second confirmations (described above) the order is cleared. If a change occurs before the first confirmation that worsens the price or reduces the size (e.g., terms of a selected order are no longer available), then the confirmation line is cleared and the user is returned to the EMON screen (FIG. 10). After such an event, the sweep trading process may be initiated again. A pair of e-mail confirmation messages are sent out for each order executed within the sweep transaction.

Spread-Trading

This feature allows users to directly trade on a difference between a bid price and an offer price, or a difference between two bid or two offer prices, for forwards in given forward terms. In the spread trading process, the electronic trading system automatically generates a spread-trading order, illustrated in FIG. 11, by evaluating actual bids and offers for forwards on the system. For example, the system compares a current bid price and a current offer price for forwards in a forward term and creates a spread order representing the difference between the compared bid price and compared offer price. Similarly, the system may compare two bid or two offer prices to generate either a spread-bid order or a spread-offer order, respectively.

Preferably, a user completing a spread-trading order does not know the individual bid and/or offer orders comprising the spread-trading, spread-bid or spread-offer orders. Rather, as the orders are completed, the system completes the individual orders included therein. For example, in the case of a completed spread order, the system completes the JO spread order, the bid order and the offer order from which the spread order was originally generated.

As referenced to herein, the bid and/or offer orders comprising the spread-trading, spread-bid and spread-offer orders include an order on a primary leg and an order on a secondary leg. The system maintains links to the orders on the legs. For example, a first link is maintained to a bid order on a primary leg and a second link is maintained to an offer order on a secondary leg. To complete an order, the system traverses the links and completes the orders on the primary and secondary legs, as discussed above.

As shown in FIG. 11, the spread trading process includes functions for suspending orders ("93<GO>" function), canceling a trader's spread orders ("98<GO>" function) and canceling a firm's spread orders ("99<GO>" function).

In another aspect of the present invention, FIG. 11 illustrates a screen displaying forwards in more than one trading region. That is, FIG. 11 displays spread orders available for execution within a "CIN/PJM" trading region and a "CIN/ENT" trading region. Where possible, the present invention combines the display of trading regions and available order therein, to minimize the number of screen images a trader reviews to fully evaluate the available market.

Joining

In another feature of the present invention, the electronic trading system provides for joining orders. The joining feature allows a trader to add a new bid or offer that has the same terms (e.g., price and quantity) of a perceived best bid or offer (where the best bid or offer is displayed at the top of the list of available bids/offers). That is, the data relating to the best bid or offer is copied and a new bid or offer is added under the trader's own identification. The best bid or offer and the new bid or offer are for the same terms, but are posted for each trader individually.

For example, and with reference again to FIG. 10, a trader may join the best executable offer for the "Sep 99" forward (displayed at line "1)" of the Executable column) by selecting (i.e., clicking) the top offer and invoking the join function. In response, a new offer is automatically added to the Executable column and the My Orders column, "/18.00 25*" and "/18.00 25," respectively. The new offer is associated to the trader that invoked the join feature.

In a preferred embodiment, illustrated in FIG. 9A, the "My Orders" column of the EMON screen includes blank lines (e.g., line 104) having arrows ("←" and "→") presented thereon. In this embodiment, the joining feature may be invoked by selecting one of the respective right or left arrows on one of the blank lines.

Blinding

In order to preserve order anonymity, the BLOOMBERG POWERMATCH® system 40 prevents users from deducing the identity of ordering parties by changing enablement settings. This is accomplished by blinding an entire firm for a set period of time after an enablement setting is changed by a user in that firm. In one embodiment, for example, the set period of time is about 5 minutes. The blinding feature may be accomplished by blanking all monitors in the firm actively running the BLOOMBERG POWERMATCH® client application.

Preferably, blinding is implemented as follows:

1. When a user associated to a particular firm (counterparty) changes a credit (i.e., an enablement) setting using the EFMP function, a message is broadcast to all trade servers informing them of the change.
2. Upon receiving the change notification message, the respective trade server 68 determines whether live trading is "on." That is, whether any users/traders similarly associated to the particular firm are presently executing the BLOOMBERG POWERMATCH® client application. If not, then trading is not and the trade server 68 ignores the message and the blinding process terminates. The message is ignored for, as trading is made live, all firm and enablement settings are reloaded to make the most current setting available to the BLOOMBERG POWERMATCH® client applications running on the user stations 22. If trading is live, then the blinding process continues as detailed below.
3. The respective trade server 68 updates the enablement table stored in memory, and runs a minimal enablement check to determine whether the updating counterparty firm or the affected counterparty firm has fallen below the minimal enablement requirement (e.g., there is at least one sell bit on one side matched by at least one buy bit in the same forward on the other side), as described above. For any counterparty firm falling below the minimum enablement requirement, all orders are canceled, all monitors blanked, and messages are sent out to inform the users of what has happened. It follows that if a counterparty firm has attained the minimal enablement requirement as a result of a modification to a setting, then that firm is enabled to trade.

4. All users/traders of the counterparty firm that initiated the update of the enablement setting is checked. If the updating firm has already been disabled (permanently or temporarily) at the time that the message arrives, or is disabled during step 3, no further action is taken.

5. If not, all the users/traders associated with the updating counterparty firm are temporarily disabled. That is, all of the orders of the associated traders are canceled, and all monitors of the associated traders are blanked. The associated traders that are currently running EMON, get messages with an explanation of what has happened.

6. A re-enable firm event is placed on a long-term event queue (preferably implemented as a software routine running on the respective trade server 68) and scheduled for execution (arrival) at a predetermined time period, for example, about 5 minutes. When executed, the re-enable firm event reactivates the updating firm for trading. Additionally, notify events are placed on the long-term event queue for all users whose monitors have been blanked.

7. When the re-enable firm and notify events arrive, all traders of the updating counterparty firm are re-enabled to trade and notifications are sent to the users/traders informing them of the re-enabled status.

Suspend-Trading

The suspend-trading feature allows a user to suspend all of their active orders with a single action, e.g., a click of a button displayed on their monitor with their mouse or similar such pointing device. Preferably, when orders are suspended, they are grayed out. The suspended orders remain on the user's own monitor, but disappear (are deleted) from all other user's monitors. In one embodiment, a button labeled "suspend" changes to a to label value of "restore." Selecting (i.e., clicking) the restore button restores all suspended orders to a live status, that is, reloads the orders to all user's monitors to make the orders available for execution.

While the orders are suspended, a user cannot add new orders, modify existing orders, or execute an available order. The only actions that the user may perform are to cancel or restore their orders. Cancellation is done by either selecting (i.e., clicking) a "mass-cancel" button, or by selecting individual orders in the My Orders column, as described above. In accordance with the preferred embodiment of the present invention, a user cannot have a mix of live and suspended orders in the same region.

Preferably, the suspend-trading feature is implemented as follows.

1. Each user has a unique, per-user node in the trade server 68, regardless of the number of screens the user has subscribed to. This node includes information for tracking how many orders the user has pending in each region, and how many are pending across all regions. The node also includes information for tracking how many suspended orders the user has in the system. When the number of suspended orders in a region is zero, user is live for trading within the region. The orders suspended as a result of an order modification transaction (updating order terms) are not included within the count of suspended orders.

2. When the user selects the suspend button, the trade server 68 traverses all order queues, finds all of the user's orders, converts their order states to suspended, and increases the respective suspend counters (one counter per region). The server 68 then determines whether the values of the suspend counters are equal to the values of the order counters.

If all counter have zero values, then no orders were found and the user remain in the live trading mode.

3. When the user selects an individual suspended order to remove it, the values with the suspend and the order counters are decreased by a value of one. Additionally, when market moves result in the suspended order crossing the market, the system automatically cancels the suspended order. Accordingly, both the values of the suspend and the order counters decrease by one. If a user hits a "mass-cancel" button, all orders are canceled and both the suspended and the order counters drop to zero. When the counter values are zero, the user is restored to live trading mode.

4. When the user selects the "restore" button, the trade server 68 essentially reverses the suspend procedure: order states are changed to Open, and the suspend counters are decremented by the number of restored orders. At the end, the server 68 verifies that the suspend counter value has reached zero.

Sliding Ticker Display

The sliding ticker feature allows users to observe bidding and trading activities across several regions. When a market best price of a forward changes, or a trade occurs, a notification message is broadcast to all users (a message is scrolled right to left across the bottom of each user's monitor 32). Preferably, messages regarding trades (referred to as trade ticks) display the price and the size of the trade just completed, while messages regarding bids/offers (referred to bid/ask ticks) display information pertaining to a newly added or modified bid or offer for a forward.

Preferably, the sliding ticker feature is implemented as follows.

Whenever a trade occurs, and a trade node is formed (described above), the price and size tick is placed into a Sliding Line buffer in a trade server 68. Whenever an order changes, the trade server compares up-to-now best prices for the forward from the stored order information, calculates a new best price, and if there is a change, places a forward tick into Sliding Line buffer. Then the trade server updates up-to-now prices (stored in data node). Ticks are placed into the Sliding Line buffer by shifting the contents of the buffer to the left, inserting a new tick in its rightmost portion, resetting its timer, and repainting the tick information on all user screens.

When a five-second Sliding Line timer expires (in the short term event queue 35 described above), the line is shifted left, the rightmost portion is blanked, the user screens are repainted, and if the Sliding Line buffer is not fully blank yet, a five-second timer is set again.

Reserve-Trading

The reserve-trading feature allows a user to reserve a size, or quantity, that the user is willing to trade in excess of the size term listed on a trading order. That is, a size of a trading order may include a displayed quantity (e.g., in MWh) and a non-displayed quantity. The non-displayed quantity represents an additional quantity (i.e., a reserve) that the trader is willing to trade.

Generally speaking, a trader may wish to "hide" the reserve so that other traders are not alerted to the full extent at which the trader is prepared to enter the market. For example, a trader may wish to post offers having size terms listed in certain minimum increments so as not to adversely affect terms of bids other traders are willing to make with an entity offering a relatively large quantity of electricity forwards.

In one embodiment of the trading system 20, a first trader (e.g., Trader A) adds an offer order having term of "50 MWh @ $100.00" and designates a reserve to the offer order of "1000 MWh." As noted above, the size term of the offer order is displayed on the system 20 (i.e., within the Executable Orders column) as "50 MWh," while the reserve is not displayed. A second trader (e.g., Trader B) lifts the offer order of "50 MWh @ $100.00" and the trade is completed. In response to the completion of the trade, the trading system 20 automatically adds a new offer order at the same terms of the previous order by drawing from the reserve. That is, when a reserve is available, the trading system 20 automatically "refills" offer orders.

Alternatively, Trader B lifts the offer order by indicating an acceptance of as the price term of "$100.00" and by making a counter-offer that is greater than the displayed quantity. For example, Trader B lifts the offer order by making a counter-offer of "100 MWh @ $100.00." The trading system 20 verifies that the terms of the counter-offer do not exceed the available reserve. If the terms are acceptable, i.e., can be met by the available reserve, the reserve is drawn on and the trade is completed at the counter-offer terms. Otherwise, if the reserve can not meet the terms of the counter-offer, then the trade is completed according to the original terms. The trading system 20 may also, if pre-approved by the trading parties, complete the trade up to the amount of the available reserve. For example, if Trader B's counter-offer was for "1200 MWh @ $100.00," the trade is completed at "1000 MWh @ $100.00" by exhausting the available reserve.

While the invention has been described and illustrated in connection with preferred embodiments, many variations and modifications, as will be apparent to those of skill in the art, may be made without departing from the spirit and scope of the invention. By example, and as discussed above, the teachings of this invention are not intended to be limited to any specific type of trading system, that is, it should be appreciated that the features disclosed herein are not limited to application in an electricity forwards trading system such as the preferred Bloomberg PowerMatch$^{SM}$ System owned by Bloomberg L.P. Similarly, the invention is not limited to a trading system where the identity of the parties negotiating a trade are anonymous up to the time that the trade is made.

Accordingly, the invention as set forth in the appended clams is not limited to the precise details of construction set forth above as such other variations and modifications as would be apparent to one skilled in the art are intended to be included within the spirit and scope of the invention as set forth in the defined claims.

The invention claimed is:

1. A trading system for trading forwards between parties, the system comprising:
  at least one trade execution computer capable of executing forwards trades from forwards orders in the trading system, the at least one trade execution computer communicating with a plurality of user stations over a communications network; and
  a computer readable medium which stores computer programming executed by the at least one trade execution computer to cause the at least one trade execution computer to carry out a method for executing a forwards spread trade from the forwards orders in the trading system comprising a first leg forwards trade and a second leg forwards trade, and a price spread comprising the difference between prices of the first and second leg forwards trades, the at least one trade execution computer at least:
  automatically generating from the forwards orders in the trading system one of (a) a forwards spread order including a spread price representing a difference between prices of potential first and second leg forwards trades and (b) an order relating to one of the first and second leg forwards trades and a forwards spread order; the automatically-generated order not being initiated by a user station;
  providing the automatically-generated order to the user stations; and
  in response to a request from a user station to execute the automatically-generated order, executing the forwards spread trade including executing the first leg forwards trade at the first price and the second leg forwards trade at the second price, thereby providing the price spread between the first and second prices of the first leg and second leg forwards trades, respectively.

2. A method for trading forwards between parties in a trading system which comprises at least one trade execution computer capable of executing forwards trades including forwards spread trades, the at least one trade execution computer communicating with a plurality of user stations over a communications network, the forwards spread trades comprising a first leg forwards trade, a second leg forwards trade, and a price spread comprising the difference between the prices of the first and second leg forwards trades, the method comprising:
  from forwards orders stored in the trading system, the at least one trade execution computer automatically generating one of (a) a forwards spread order including a spread price representing a difference between prices of potential first and second leg forwards trades and (b) an order relating to one of the first and second leg forwards and (b) a forwards spread order; the automatically-generated order not being initiated by a user station;
  the at least one trade execution computer providing the automatically-generated order to the user stations;
  in response to a request from a user station to execute the automatically-generated order, the at least one trade execution computer executing the forwards spread trade including executing the first leg forwards trade at the first price and the second leg forwards trade at the second price, thereby providing the price spread between the first and second prices of the first leg and second leg forwards trades, respectively.

\* \* \* \* \*